United States Patent
Nishio

(10) Patent No.: US 11,156,498 B2
(45) Date of Patent: Oct. 26, 2021

(54) OBJECT DETECTOR, SENSING DEVICE, AND MOBILE APPARATUS

(71) Applicant: Ricoh Company, Ltd., Tokyo (JP)

(72) Inventor: Takuei Nishio, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 70 days.

(21) Appl. No.: 16/662,067

(22) Filed: Oct. 24, 2019

(65) Prior Publication Data

US 2020/0056937 A1 Feb. 20, 2020

Related U.S. Application Data

(62) Division of application No. 15/616,359, filed on Jun. 7, 2017, now Pat. No. 10,514,295.

(30) Foreign Application Priority Data

Jun. 10, 2016 (JP) .................................. 2016-115957

(51) Int. Cl.
  *G01J 1/18* (2006.01)
  *G01V 8/18* (2006.01)
  *G01J 1/44* (2006.01)

(52) U.S. Cl.
  CPC . *G01J 1/44* (2013.01); *G01J 1/18* (2013.01); *G01V 8/18* (2013.01); *G01J 2001/4406* (2013.01)

(58) Field of Classification Search
  CPC ............................. G01J 1/18; G01J 2001/4406
  See application file for complete search history.

(56) References Cited

U.S. PATENT DOCUMENTS

| | | | |
|---|---|---|---|
| 2007/0084763 A1 | 4/2007 | Stephenson et al. | |
| 2008/0173803 A1* | 7/2008 | Dunki-Jacobs | A61B 1/045 250/234 |
| 2009/0158865 A1 | 6/2009 | Dallongeville et al. | |
| 2013/0120734 A1 | 5/2013 | Ogata et al. | |

(Continued)

FOREIGN PATENT DOCUMENTS

| | | |
|---|---|---|
| JP | 07-270535 | 10/1995 |
| JP | 9-318749 A | 12/1997 |
| JP | 2009-063339 A | 3/2009 |

(Continued)

OTHER PUBLICATIONS

Office Action dated Mar. 2, 2020 in Japanese Patent Application No. 2016-115957, 4 pages.

*Primary Examiner* — Thanh Luu
(74) *Attorney, Agent, or Firm* — Xsensus LLP

(57) ABSTRACT

An object detector including a light-emitting system to emit light to an object, a light detector, a signal detector, and a threshold adjuster. The light detector receives the light emitted from the light-emitting system and reflected by the object, and output a signal. The signal detector detects the signal output from the light detector based on a threshold value of voltage. The threshold adjuster changes the threshold value between when the light-emitting system emits light to a part of a light-emission range of the light-emitting system and when the light-emitting system emits light to other part of the light-emission range other than the part of the light-emission range.

19 Claims, 14 Drawing Sheets

(56) References Cited

U.S. PATENT DOCUMENTS

2014/0268123 A1    9/2014    Juvinall et al.

FOREIGN PATENT DOCUMENTS

| JP | 2009-069003 A | 4/2009 |
| JP | 2011-128112 A | 6/2011 |
| JP | 2012-107984 A | 6/2012 |
| JP | 2012-220466 A | 11/2012 |
| JP | 2013-104746 | 5/2013 |
| JP | 2017-062169 A | 3/2017 |

* cited by examiner

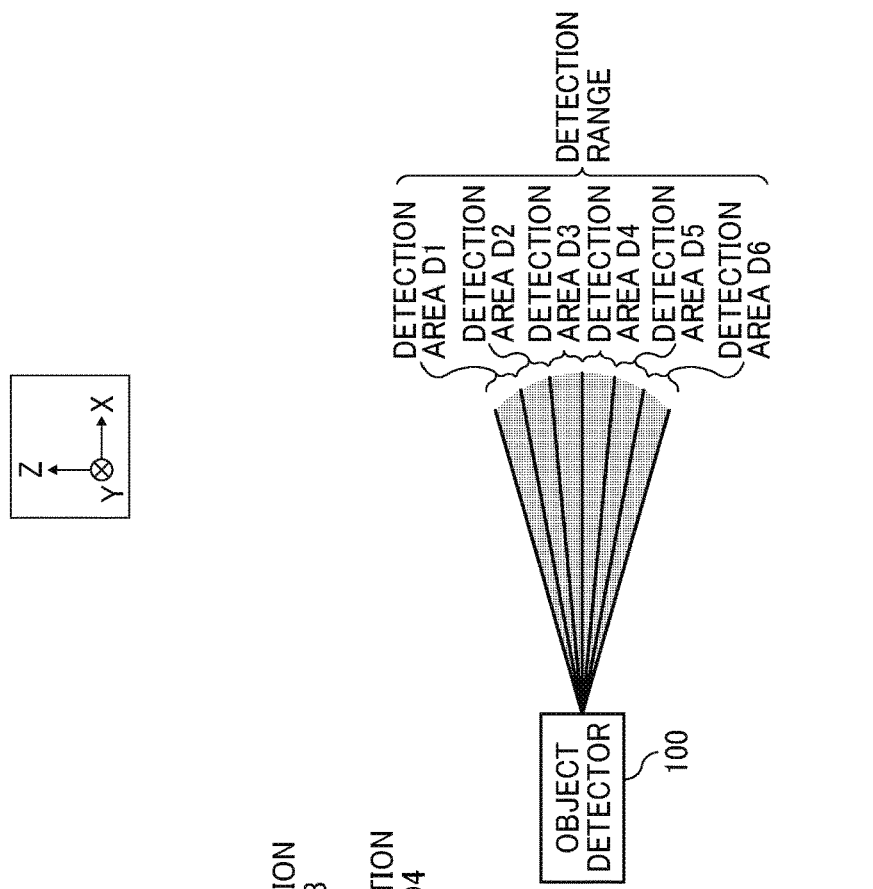
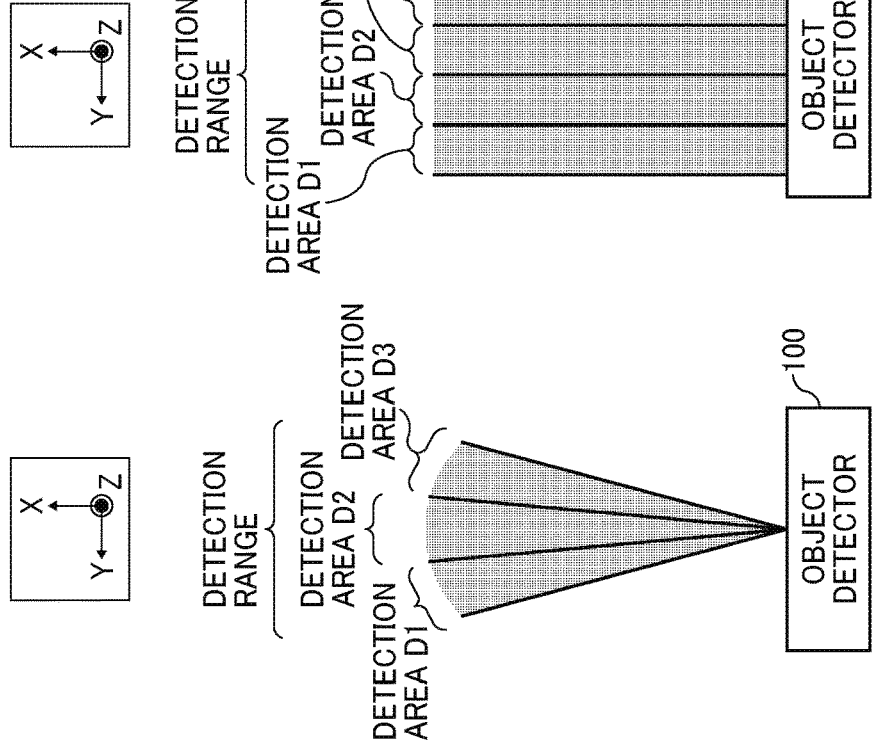

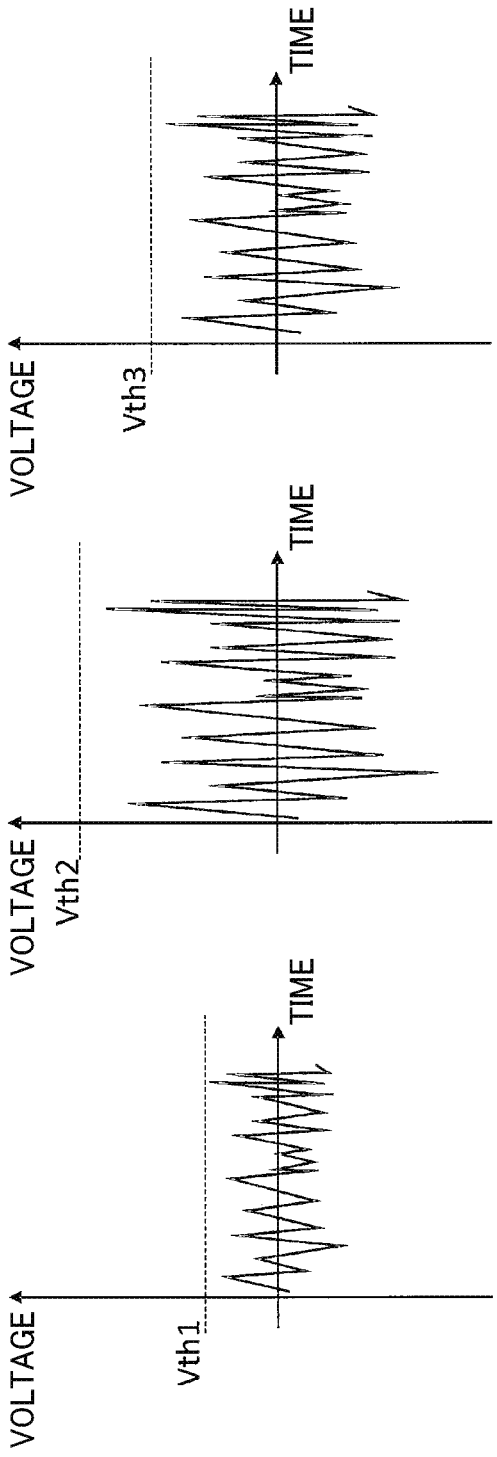

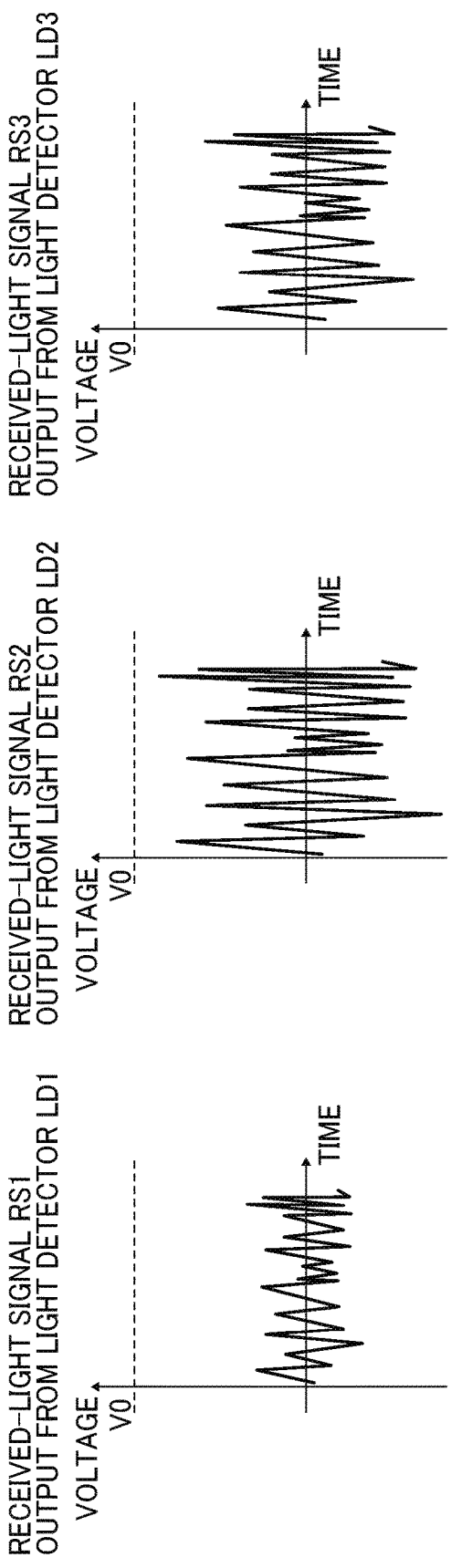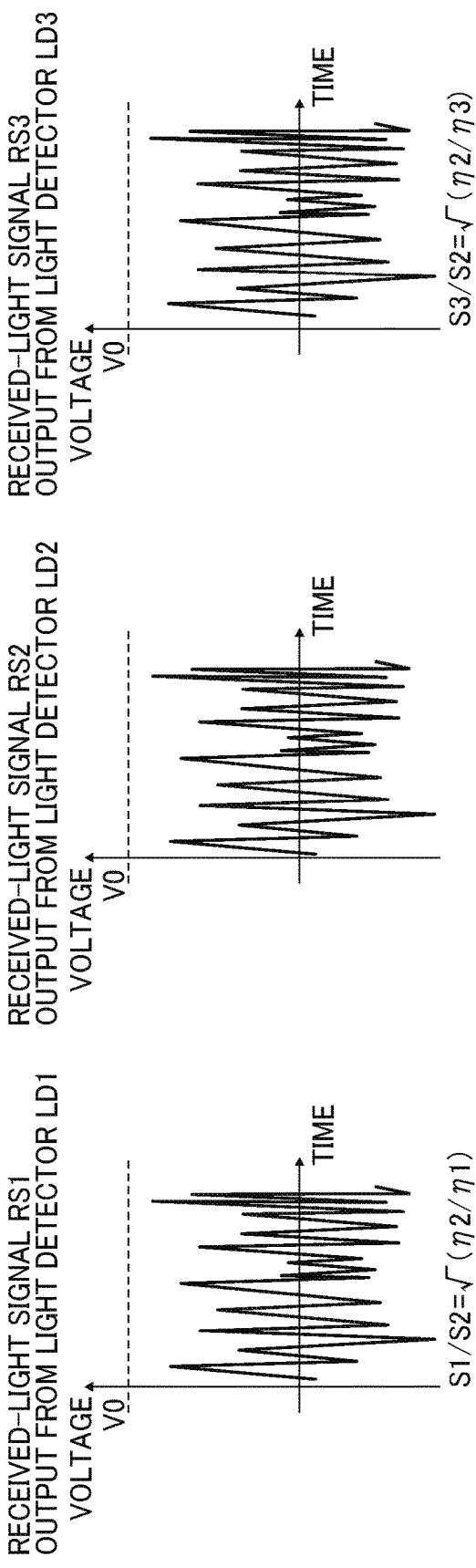

OBJECT DETECTOR, SENSING DEVICE, AND MOBILE APPARATUS

CROSS-REFERENCE TO RELATED APPLICATIONS

This patent application is a divisional of U.S. application Ser. No. 15/616,359, Jun. 7, 2017, which is based on and claims priority pursuant to 35 U.S.C. § 119(a) to Japanese Patent Application No. 2016-115957, filed on Jun. 10, 2016 in the Japan Patent Office, the entire disclosures of each are hereby incorporated by reference herein.

BACKGROUND

Technical Field

Embodiment of the present disclosure relate to an object detector, a sensing device, and a mobile apparatus.

Related Art

An apparatus has been known that emits light to a light-emission range and receives the light reflected and scattered by an object to detect information regarding the object, such as the presence of the object and the distance to the object.

However, such an apparatus has room for improvement in preventing a reduction in detection distance within the projection range.

SUMMARY

In one aspect of this disclosure, there is provided an improved object detector including a light-emitting system to emit light to an object, a light detector, a signal detector, and a threshold adjuster. The light detector receives the light emitted from the light-emitting system and reflected by the object, and output a signal. The signal detector detects the signal output from the light detector based on a threshold value of voltage. The threshold adjuster changes the threshold value between when the light-emitting system emits light to a part of a light-emission range of the light-emitting system and when the light-emitting system emits light to other part of the light-emission range other than the part of the light-emission range.

In another aspect of this disclosure, there is provided an improved object detector including a light-emitting system, a light detector, and a signal detector. The light detector includes a light-receiving element to receive light emitted from the light-emitting system and reflected by the object, and output a signal. The signal detector detects the signal output from the light detector based on a threshold value of voltage. A degree of sensitivity of the light detector differs between when the light-emitting system emits light to a part of a light-emission range of the light-emitting system and when the light-emitting system emits light to another part of the light-emission range.

In still another aspect of this disclosure, there is provided an improved sensing device including the above-described object detector and a monitoring controller. The monitoring controller determines at least one of a presence or an absence of the object, a direction of movement of the object, and a moving speed of the object, based on an output of the object detector.

In yet another aspect of this disclosure, there is provided an improved mobile apparatus including a mobile object and the above-described object detector mounted on the mobile object.

In further aspect of this disclosure, there is provided an improved mobile object including a mobile object and the above-described sensing device mounted on the mobile object.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 4A through 4C each is an illustration of an example in which a detection range is divided into a plurality of detection areas;

FIGS. 5A through 5C are waveform charts of received-light signals output from light detectors, respectively;

FIGS. 10A-1, 10A-2, and 10A-3 are waveform charts of received-light signals from the light detectors, respectively each light detector having the same detection sensitivity over the entire detection areas;

FIGS. 10B-1, 10B-2, and 10B-3 are waveform charts of received-light signals from the light detectors, respectively each light detector having a different detection sensitivity for each detection area;

Figure 1:
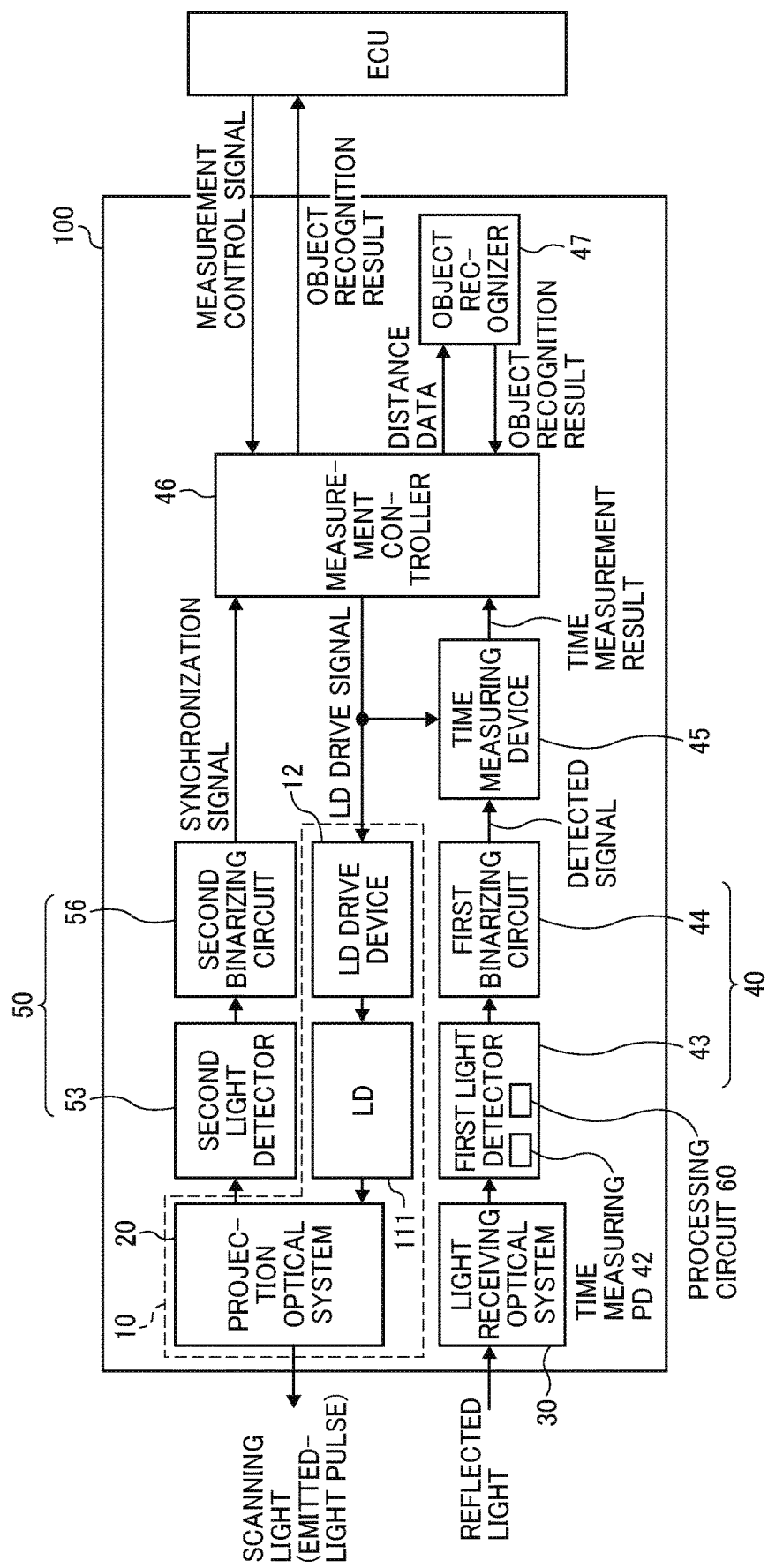
FIG. 1 is a block diagram of a schematic configuration of an object detector according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

In recent years, a measuring device for measuring a round-trip distance to a target using the TOF method has been widely used in the industries of the technology for sensing vehicles, the motion-capture technology, and the range instruments. Such a measuring device includes a light-emitting device, a light-receiving element, and various drive circuits. The measuring device causes the light-emitting element to emit a light beam to a measurement target and causes the light-receiving element to receive light reflected by the measurement target. More specifically, the measurement device detects a difference between the light-emitting timing and the light-receiving timing as well as the phase delay through signal processing of a signal processor, thus measuring a round-trip distance to the target.

As an example of the measurement device, LiDARs are widely used to be mounted in air planes, railways, and vehicles. There are various LiDARs such as a scanning LiDAR. In a scanning LiDAR as an example, a light source emits a laser beam, and a rotating mirror scans a scanning range with the emitted laser beam. Then, a light detector detects the light reflected or scattered from an object using the rotating mirror, thus detecting the presence of the object within a desired range and the distance to the object.

Such a scanning LiDAR, which scans both an area illuminated by a laser beam and an area to be detected by a detector, concentrates a laser beam on only a portion to be detected, thereby minimizing the detectable range of the detector. Thus, the scanning LiDAR is advantageous for the accuracy of detection and the detection distance, and the cost for the detecto.

However, the scanning LiDAR fails to accumulate data, and thereby detection errors are more likely to occur particularly in the detection of an object at long range than the non-scanning LiDAR does. That is, the scanning LiDAR has difficulties in increasing the accuracy of detection in long-range finding.

To handle such circumstances, there is a need for the detectable distance to be of the order of 100 m. In general, the amount of light reflected from the object in a distance of 100 m is approximately from several nW through several dozen nW. In other words, a light-receiving system preferably detects received-light signals without any detection errors. The received-light signal relative to weak light of approximately several nW has a small signal strength so that the received-light signal is vulnerable to random noise, which adversely affects the accuracy of distance measurement and the reliability of object detection.

The above-described random noise includes circuit noise and shot noise. The shot noise particularly has an adverse effect. The circuit noise, which is approximately several millivolts (mV) in general, is created by thermal noise due to resistance or radiation noise picked up by the substrate.

In contrast, the shot noise is white noise generated in light intensity measurement. The degree of shot noise is proportional to the square root of time-averaged amount of light. The shot noise might increase to be several tens mV or more when sensitivity or disturbance light is intense. This is why the shot noise is more likely to have adverse effects on the accuracy of distance measurement and the reliability of object detection. The shot noise is generated in DC (direct current) light detection as well, which is clear from the fact that the degree of shot noise is proportional to the square root of the time-averaged amount of light.

Figure 15A:
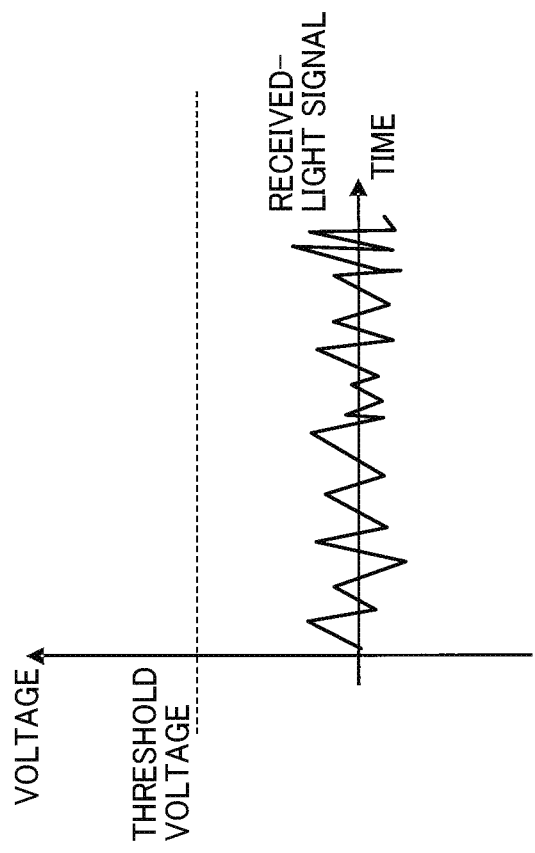
FIG. 15A is an illustration of a waveform of a received-light signal with a great shot noise.
Figure 15B:
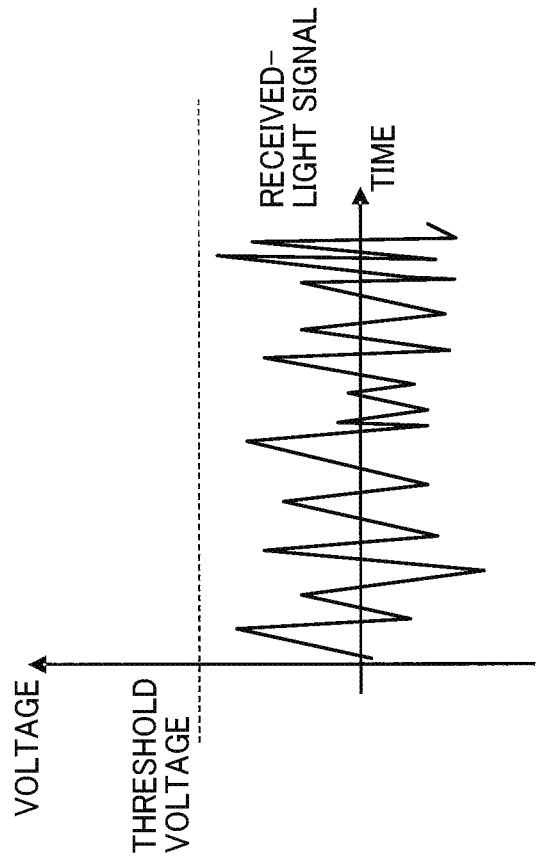
FIG. 15B is an illustration of a waveform of a received-light signal with a small shot noise.

In a system that detects a received-light signal based on a threshold voltage, the threshold voltage is sufficiently increased relative to shot noise to prevent an erroneous detection due to noise. Accordingly, the threshold voltage is determined assuming that shot noise is maximum (see FIG. 15A). However, such a determined threshold voltage is excessively large for relatively small shot noise (see FIG. 15B), which reduces the detection distance to an excessive degree. Thus, the threshold voltage is preferably set as small as possible within the range in which no erroneous detection occurs, so that the detection distance can be increased.

To handle such circumstances, the presence or absence of noise may be determined based on frequency characteristics of a received signal when the received signal exceeds a threshold value before the emission of a laser beam. However, such a method employs an analog-to-digital (AD) and an amplitude detector, which leads to an increase in size and cost of a circuit.

There is another method for adjusting an amplification factor of a received-light signal to a maximum level within the rage that any erroneous detection due to noise does not occurs, during the pause of a light-emitting device for a certain period. However, such a method, which involves a pause period, might fail to set the amplification factor to a specified value when a frame rate is limited or the noise level gently changes over time (for example, the intensity of extraneous light gently changes). The method also employs a variable gain amplifier, thus increasing the cost.

In view of the above circumstances, the present inventor has conceived of the following embodiments to achieve an object detector that enables a long distance detection even in areas having a low light utilization efficiency in effective manners without an increase in size and cost of a circuit and without a use of a feedback circuit.

A description is provided of an object detector 100 according to one embodiment of the present disclosure referring to the drawings.

FIG. 1 is a block diagram of a schematic configuration of the object detector 100.

The object detector 100 is a LiDAR (Light Detection and Ranging) device to detect the presence of an object, such as a preceding vehicle, a parked vehicle, a structure, or a pedestrian, and the distance to the object. The object detector 100, which is mounted on a vehicle, e.g., an automobile, as a movable body, is powered from a vehicle battery. In the present embodiment, a scanning LiDAR is used as the object detector 100. In some embodiments, a non-scanning LiDAR may be used instead.

As illustrated in FIG. 1, the object detector 100 includes a light-emitting system 10, a light receiving optical system 30, a detection system 40, a time measuring device 45, a synchronous system 50, a measurement controller 46, and an object recognizer 47.

The light-emitting system 10 includes a laser diode LD10 as a light source, an LD drive device 12, and a projection optical system 20.

The laser diode L10, which is also called an end-surface emitting laser, is driven by the LD drive device 12 (a drive circuit) to emit a laser beam. The LD drive device 12 causes the laser diode LD10 to emit a laser beam, using a LD drive signal, which is a rectangular pulse signal, output from the measurement controller 46. Examples of the LD drive device 12 include a capacitor connected to the laser diode LD10 to supply electric current to the laser diode LD10, a transistor to switch conduction and non-conduction between the capacitor and the laser diode LD10, and a charger to charge the capacitor. The measurement controller 46 starts or stops the measurement in response to a measurement control signal (a measurement start signal and a measurement stop signal) from an electronic control unit (ECU) on vehicle.

Figure 2A:
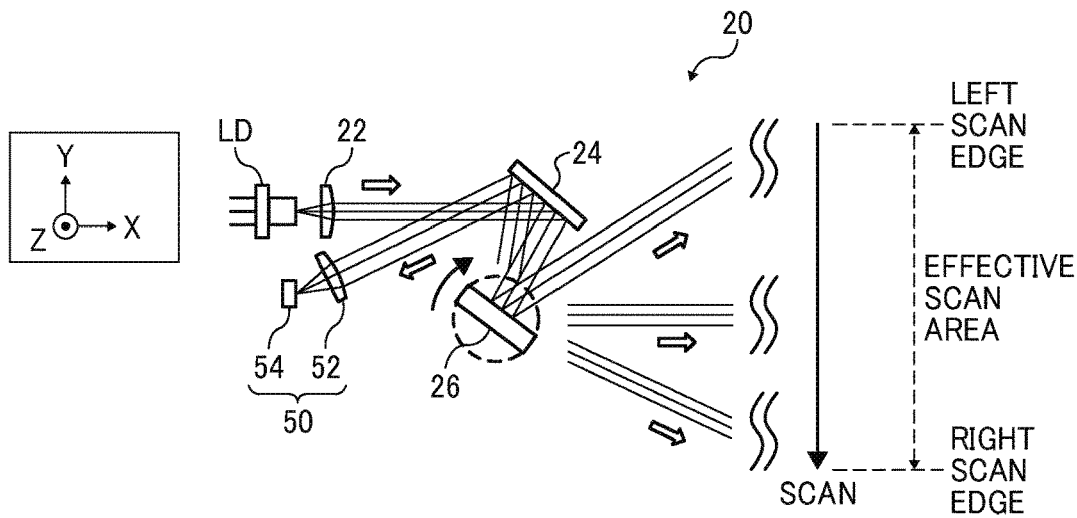
FIG. 2A is an illustration of a projection optical system and a synchronous system.
Figure 2B:
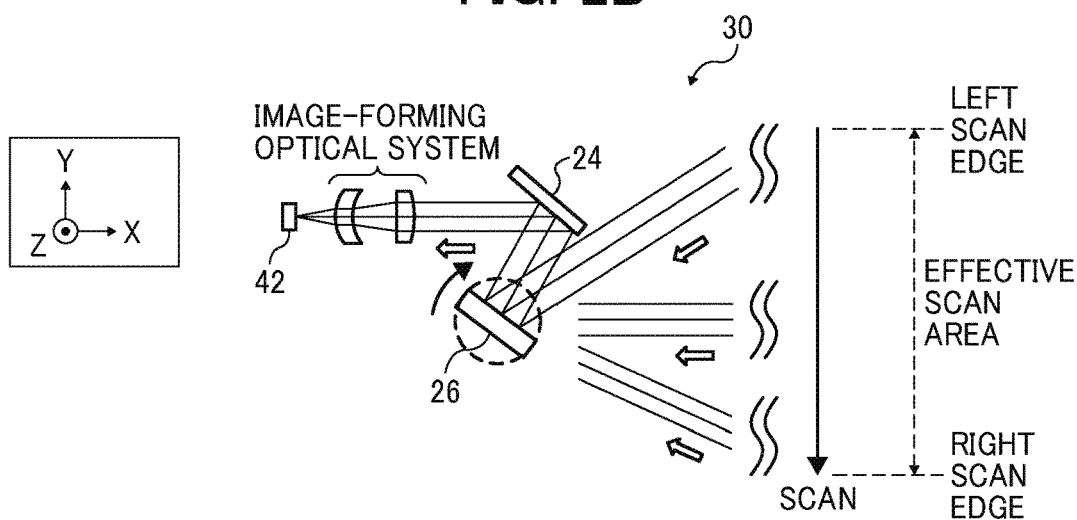
FIG. 2B is an illustration of a light-receiving optical system.

FIG. 2A schematically illustrates the projection optical system 20 and the synchronous system 50. FIG. 2B schematically illustrates the light receiving optical system 30. A description is provided below of the projection optical system 20, the synchronous system 50, and the light receiving optical system 30, using an XYZ three-dimensional rectangular coordinate system illustrated in FIGS. 2A, 2B, and 2C as appropriate, in which a vertical direction is a Z-axis direction.

The projection optical system 20 includes a coupling lens 22, a reflection mirror 24, and a rotating mirror 26 as a deflector. The coupling lens 22 is disposed on the optical path of light emitted from the laser diode LD10. The reflection mirror 24 is disposed on the optical path of the light having passed through the coupling lens 22. The rotating mirror 26 is disposed on the optical path of the light reflected from the reflection mirror 24. In this case, the reflection mirror 24 is disposed on the optical path between the coupling lens 22 and the rotating mirror 26, such that the optical path is folded to reduce the size of the detector 100.

In the optical path, the light emitted from the laser diode LD10 passes through the coupling lens 22 to be shaped into a predetermined beam profile, and the shaped light is then reflected by the reflection mirror 24. The rotating mirror 26 deflects the reflected light around the axis Z within a predetermined range of deflection.

The light deflected by the rotating mirror 26 within the predetermined range of deflection corresponds to light projected by the projection optical system 20, that is, light projected from the object detector 100.

The rotating mirror 26 includes a plurality of reflection planes around the axis of rotation (axis Z) to reflect (deflect) the light reflected from the reflection mirror 24 while rotating around the axis of rotation, thereby causing the light to unidimensionally scan an effective scan area corresponding to the range of deflection in a horizontal one-axis direction (Y-axis direction). In this case, the range of deflection, i.e., the effective scan area lies on +X side. Hereinafter, the direction of rotation of the rotating mirror 26 is referred to as a "direction of rotation of mirror". In the present disclosure, the effective scan area is referred to also as a projection range or a detection range.

As illustrated in FIG. 2A, the rotating mirror 26 includes two reflection planes opposed to each other. However, the present disclosure is not limited to the configuration. In some embodiments, the rotating mirror 26 may include one reflection plane or three or more reflection planes. Alternatively, in some embodiments, the rotating mirror 26 includes at least two reflection planes, which are tilted at different angles with respect to the axis of rotation (axis Z), to switch an area to be scanned and detected in Z-axis direction.

The light receiving optical system 30 includes, as illustrated in FIG. 2B, the rotating mirror 26, the reflection mirror 24, and an image-forming optical system. The rotating mirror 26 reflects light projected from the projection optical system 20 and reflected (scattered) by an object disposed within an effective scan area. The reflection mirror 24 reflects the light reflected from the rotating mirror 26. The image-forming optical system forms an image of the light reflected from the reflection mirror 24 onto a time measuring PD 42.

Figure 2C:
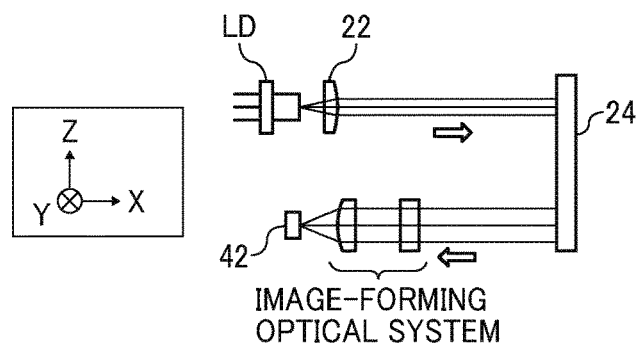
FIG. 2C is a schematic view of an optical path from a laser diode (LD) to a reflection mirror and another optical path from the reflection mirror to a time-measuring photo diode (PD)

FIG. 2C is an illustration of an optical path between the laser diode LD10 and the reflection mirror 24 and another optical path between the reflection mirror 24 and the time measuring PD 42.

As is clear from FIG. 2C, the projection optical system 20 and the light receiving optical system 30 overlap in Z-axis direction. The rotating mirror 26 and the reflection mirror 24 are common between the projection optical system 20 and the light receiving optical system 30. Such a configuration reduces relative misalignment between the range of illumination of the LD and the range of light reception of the time measuring PD 42 on an object, thus achieving stable detection of the object.

The light projected from the projection optical system 20 and reflected (scattered) by an object proceeds, via the rotating mirror 26 and the reflection mirror 24, through the image-forming optical system, thereby collecting on the time measuring PD 42, referring to FIG. 2B. In FIG. 2B, the reflection mirror 24 is disposed between the rotating mirror 26 and the image-forming optical system, folding the optical path to reduce the size of the system. In this case, the image-forming optical system includes two lenses (image-forming lenses). However, in some embodiments, the image-forming optical system may include a single lens or three or more lenses. Alternatively, in some embodiments, a mirror optical system may be employed for the image-forming optical system.

Referring to FIG. 1, the detection system 40 includes a first light detector 43 (sometimes referred to simply as a light detector) and a first binarizing circuit 44 (comparator).

Figure 3A:
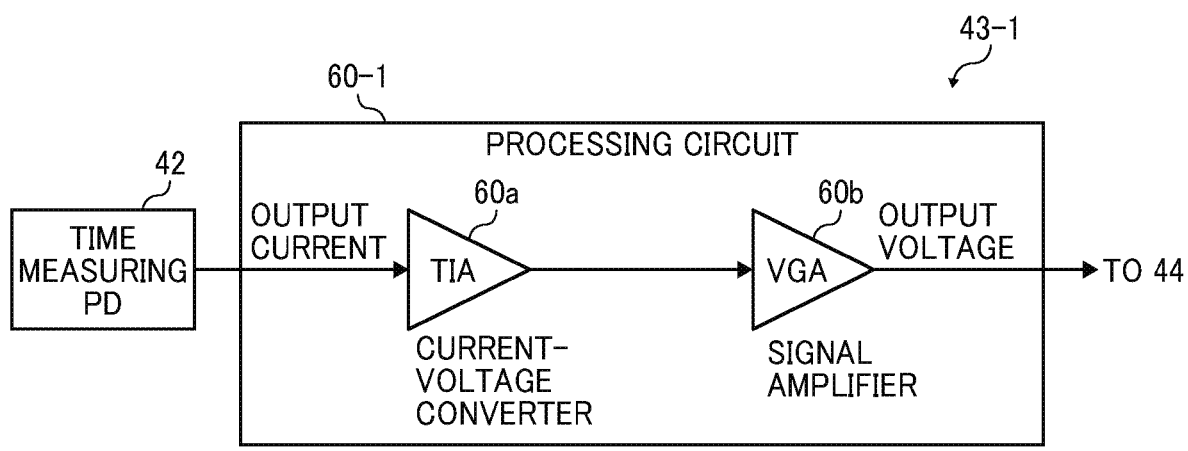
FIG. 3A is a schematic illustration of configuration of a first optical detector according to an embodiment of the present disclosure.
Figure 3B:
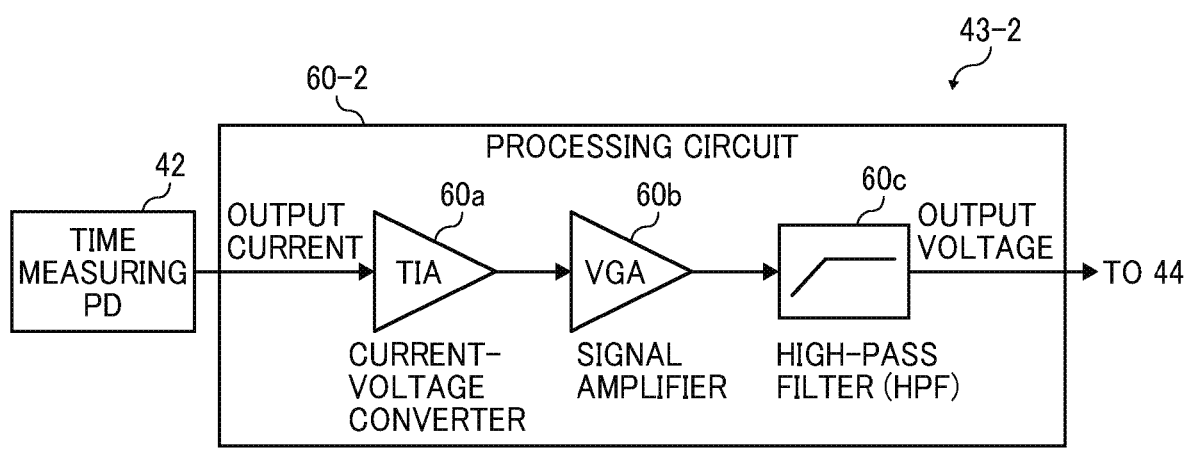
FIG. 3B is a schematic illustration of configuration of a second optical detector according to an embodiment of the present disclosure.

FIG. 3A and FIG. 3B are an illustration of a light detector 43-1 and another light detector 43-2, respectively as example configurations of the first light detector 43.

As illustrated in FIGS. 3A and 3B, the first light detector 43 includes the time measuring PD 42 (photodiode) as a light-receiving element and a processing circuit 60 (60-1 or 60-2). The time measuring PD 42 receives light that has been emitted from the projection optical system 20, reflected or scattered by an object within the effective scan area, and has passed through the light receiving optical system 30.

Referring to FIGS. 3A and 3B, each of the processing circuits 60-1 and 60-2 of the first light detector 43 includes a current-voltage converter 60a, such as a Transimpedance Amplifier (TIA), and a signal amplifier 60b such as a high-linearity analog variable-gain amplifier (VGA). The current-voltage converter 60a converts the output current (current value) from the time measuring PD 42 into a voltage signal (voltage value). The signal amplifier 60b amplifies the voltage signal output from the current-voltage converter 60a. The processing circuit 60-2 includes a high-pass filter (HPF) 60c in the post-stage of the signal amplifier 60b.

The first binarizing circuit 44 binarizes an analog voltage signal output from the processing circuit 60 of the first light detector 43 based on a threshold voltage value and outputs the binarized signal (digital signal) as a detected signal to the time measuring device 45.

Referring to FIG. 1, the synchronous system 50 includes a second light detector 53 and a second binarizing circuit 56.

As illustrated in FIGS. 1 and 2A, the second light detector 53 includes a synchronization lens 52, a synchronization detection PD 54 as another light-receiving element, and another processing circuit. The synchronization lens 52 is disposed in an optical path of light that is emitted from the laser diode LD10 and passes through the coupling lens 22 to be reflected by the reflection mirror 24 and deflected by the rotating mirror 26, coming back to the reflection mirror 24 to be reflected thereby again. The synchronization detection PD 54 is disposed on the optical path of the light having passed through the synchronization lens 52. The described-above another processing circuit processes electric current output from the synchronization detection PD 54. The described-above another processing circuit of the second light detector 53 has the same configuration as that of the processing circuit 60-1 or the processing circuit 60-2 of the first light detector 43.

Specifically, the reflection mirror 24 is disposed upstream from the range of deflection in the direction of rotation of the rotating mirror 26. The light deflected by the rotating mirror 26 toward upstream from the range of deflection enters the reflection mirror 24. The light deflected by the rotating mirror 26 and reflected by the reflection mirror 24 passes through the synchronization lens 52 and enters the synchronization detection PD 54. Then, the synchronization detection PD 54 outputs the electric current to another processing circuit in the second light detector 53.

Note that, in some embodiments, the reflection mirror 24 may be disposed downstream from the range of deflection in the direction of rotation of the rotating mirror 26. Further, the synchronous system 50 may be disposed in the optical path of the light deflected by the rotating mirror 26 and reflected by the reflection mirror 24.

The rotating mirror 26 rotates to guide the light reflected by the reflection plane of the rotating mirror 26 to the reflection mirror 24, and the light reflected by the reflection mirror 24 enters the synchronization detection PD 54. The synchronization detection PD 54 having received the light outputs electric current, which occurs upon each receipt of light. That is, the synchronization detection PD 54 periodically outputs electric current to the second PD output detector 56.

The light emission for synchronization described above, which irradiates the synchronization detection PD 54 with light deflected by the rotating mirror 26, allows obtaining the timing of rotation of the rotating mirror 26 based on the timing at which the synchronization detection PD 54 receives light.

With a predetermined length of time elapsed after the laser diode LD10 has emitted light for synchronization, the LD10 emitting pulsed light allows the effective scan area to be optically scanned with the emitted pulsed light. That is, the laser diode LD10 emits pulsed light during a period before and after the timing at which the synchronization detection PD 54 receives light, thereby optically scanning the effective scan area.

In this case, examples of the light-receiving element for measuring time and detecting synchronization include a photo diode (PD) as described above, an avalanche photo diode (APD), and a single photon avalanche diode (SPAD) as a Geiger mode APD. The APD and the SPAD have higher sensitivity than a PD, and thus is advantageous in the accuracy of detection or the detectable distance.

The second binarizing circuit 56 binarizes an analog voltage signal output from the processing circuit of the second light detector 53 based on a threshold voltage value and outputs the binarized signal (digital signal) as a detected signal to the measurement controller 46.

The measurement controller 46 generates an LD drive signal based on the synchronization signal from the second binarizing circuit 56, and outputs the LD drive signal to the LD drive device 12 and the time measuring device 45.

That is, the LD drive signal is a light-emission control signal (periodic pulsed signal) which is delayed relative to the synchronization signal.

When receiving the LD drive signal, the LD drive device 12 applies a drive current to the laser diode LD10. The laser diode LD10 then outputs pulsed light. In this case, the duty of the pulsed light emitted from the laser diode LD10 is restricted in consideration for the safety and durability of the laser diode LD10. This is why the pulse width of the pulsed light emitted from the laser diode LD10 is preferably narrower. The pulse width is generally set in a range from approximately 10 ns through approximately several dozen ns. The pulse interval is approximately several dozen microseconds in general.

The time measuring device 45 calculates a difference in input timing between the input timing of the LD drive signal output power from the measurement controller 46 and the input timing of the detected signal (binarized signal) output from the first binarizing circuit 44, as a time difference between the timing of light emission of the laser diodes LD10 and the timing of light reception of the time measuring PD 42, outputting the calculated time difference (a time measurement result) to the measurement controller 46.

The measurement controller 46 converts the measurement result from the time measuring device 45 into distance to obtain a round-trip distance to and from an object, and outputs one-half of the round-trip distance as distance data to the object recognizer 47.

The object recognizer 47 recognizes the position of an object based on a plurality of sets of distance data obtained by one or more scans, outputting an object recognition result to the measurement controller 46. The measurement controller 46 transfers the object recognition result to the ECU.

The ECU performs, based on the transferred object recognizer, steering control of a vehicle, such as auto-steering, and speed control, such as auto-braking.

Hereinafter, a description is also given of a non-scanning object detector in addition to a scanning object detector. Note that, the non-scanning object detector projects light emitted from, for example, a light source, in a direct manner or through a lens.

FIG. 4A through FIG. 4C each is an illustration of an example in which the detection range of the object detector 100 is divided into detection areas. In FIG. 4A, the detection range of the object detector 100 has a substantially fan shape as a whole when viewed from the Z-axis direction. In FIG. 4B, the detection range of the object detector 100 has a substantially rectangular shape as a whole when viewed from the Z-axis direction. Hereinafter, the detection range in a substantially fan shape is referred to also as a detection angle range.

As illustrated in FIGS. 4A and 4B, the detection range is horizontally divided into detection areas. This configuration can be achieved by dividing the detection range at least in receiving light. More specifically, for example, at least one light-emitting element emits diverging light and a plurality of light detectors receive light reflected from an object, thereby obtaining such a divided detection range. In FIG. 4A, the detection range is horizontally divided into three detection areas D1, D2, and D3.

The detection range horizontally divided into detection areas (D1 through D4) as illustrated in FIG. 4B is obtained by dividing the detection range at least in emitting light. More specifically, for example, a plurality of light-emitting elements emit light and at least one light detector receives light reflected from an object, thereby obtaining the divided detection range. In FIG. 4B, the detection range is horizontally divided into four detection areas D1, D2, D3, and D4.

For another example, a detection range may be vertically divided into detection areas as illustrated in FIG. 4C. Such a detection range can also be obtained by dividing the detection range at least in emitting or receiving light. In FIG. 4C, the detection range is vertical direction divided into four detection areas D1, D2, D3, and D4.

The detection range may be divided into detection areas two-dimensionally, i.e., horizontally or vertically. In FIGS. 4A through 4C, the detection range is divided into a small number of detection areas, such as three to six, for the sake of simplification. Alternatively, cases in which the detection range is divided into several tens to several thousands of detection areas are also within the present disclosure.

In a system that detects a received-light signal (an output signal of a light detector) based on a threshold voltage, the threshold voltage is sufficiently increased relative to noise to prevent an erroneous detection due to noise. However, excessively increasing the threshold voltage shortens the detection distance to an excessive degree.

The intensity distribution of shot noise conforms to the normal distribution with an average of 0. Accordingly, when the upper limit of the probability (probability of erroneous detection) that the degree of noise exceeds the threshold value is determined as the specification of the system, the detection distance can be maximum (threshold voltage value can be minimum) within the range that the probability of erroneous detection fall within the specification of the system. Thus, the ratio of ideal threshold voltage relative to the standard deviation of noise can be determined.

That is, when the standard deviation of noise is obtained, ideal threshold voltage is determined accordingly. For example, when the probability of erroneous detection is reduced to be 0.2% or less, the threshold voltage is greater than or equal to any value obtained by the expression "3×standard deviation of noise" (threshold value≥3×standard deviation of noise) according to the probability density function of the normal distribution. When the threshold voltage is equal to the value of the expression "3×standard deviation of noise", a maximum detection distance can be obtained while satisfying the range of the above-described expression. For example, when the standard deviation of noise is 10 millivolts (mV), the threshold voltage is preferably 30 mV.

Hence, the ratio of the threshold voltage relative to the standard deviation of noise preferably remains the same to obtain a maximum detection distance without increasing the erroneous detection probability.

The ratio of the threshold voltage relative to ideal standard deviation of noise is preferably within the range of from 3 to 10 to prevent an erroneous detection and achieve a long-range detection although such a ratio depends on a permissible erroneous detection probability.

First Example

The following describes a first example in which a single light-emitting element emits a diverging light beam to an object and three light detectors receive the light beam reflected from the object, dividing a detection range into three detection areas, as illustrated in FIG. 4A.

In the present example, light detectors LD1, LD2, and LD3 correspond to detection areas D1, D2, and D3, respectively. The light receiving optical system 30 has light utilization efficiency $\eta1$, $\eta2$, and $\eta3$ relative to the light detectors LD1, LD2, and LD3. The time measuring PD 42 of the first light detector 43 detects received-light signals RS1, RS2, and RS3 of the light detectors LD1, LD2, and LD3, based on the threshold voltages Vth1, Vth2, and Vth3, respectively.

In the light receiving optical system 30, the constituent elements of an optical member to guide a light beam to each light detector may differ between the light detectors LD1, LD2, and LD3 or may be common among the light detectors LD1, LD2, and LD3.

The amounts of disturbance light that enter light detector LD1, LD2, and LD3 are proportional to the light utilization efficiency $\eta1$, $\eta2$, and $\eta3$, respectively. The degree of shot noise is proportional to the square root of the amount of disturbance light. Accordingly, $\sigma1$ is proportional to the square root of $\eta1$, $\sigma2$ is proportional to the square root of $\eta2$, $\sigma3$ is proportional to the square root of $\eta3$ where $\sigma1$, $\sigma2$, and $\sigma3$ represent the degrees of noise of received-light signals RS1, RS2, and RS3 of the light detectors LD1, LD2, and LD3, respectively.

The following relation of changes in threshold voltage with noise is most ideal to equalize the ratio of the threshold voltage relative to the standard deviation of noise between the three detection areas D1, D2, and D3: $Vth2=V0$, $Vth1=V0\times\sqrt{\eta1/\eta2}$, and $Vth3=V0\times\sqrt{\eta3/\eta2}$. In this case, V0 is determined to obtain an ideal value for the ratio of the threshold voltage relative to the standard deviation of noise in the detection area D2, as illustrated in FIGS. 5A through 5C.

Note that, the standard deviation of noise is not measured in real time but a preliminarily assumed value for the standard deviation of noise is determined through experiments or calculation.

That is, the process that measures noise and feeds back to a threshold value is not performed in the present embodiment. Instead, any threshold value for each detection area is determined in design.

Despite the above-described most ideal case as illustrated in FIGS. 5A through 5C, the advantageous effects (to prevent an erroneous detection and achieve a long-range detection) can be achieved by satisfying the relation that reduces the threshold voltage in a detection area with a low degree of noise as compared to another detection area with a high degree of noise. That is, the advantageous effects can be obtained with more uneven parameters without the parameters as illustrated in FIGS. 5A through 5C.

When a direct current (DC) component of disturbance light is superimposed on a received-light signal, accurately detecting pulse (pulsed light) is difficult. For this reason, a high-pass filter (HPF) 60c is disposed in a circuit for generating a received-light signal as illustrated in FIG. 3B. In FIGS. 5A through 5C, the DC components are cut off.

In the present embodiment described above, the threshold voltage is determined using the light utilization efficiency of the light receiving optical system 30. Alternatively, in some embodiments, the threshold value may be determined based on an experimental comparison of the degrees of noise in the respective detection areas having received light with a constant intensity output from the object detector 100.

In a method that detects a plurality of areas within a detection range by scanning the detection range with a laser beam, high angular resolution in the scanning direction can be achieved. Thus, the number of divisions of the detection range might range from several hundred to several thousand. As a method for determining different threshold values for the detection areas, the threshold value may be changed with discrete values, for example by determining a different threshold value for each detection area. In this case, a threshold voltage may be set for each detection area. This method, however, fails to exhibit any advantageous effects because finely adjusting the threshold value is meaningless in a practical use and such an adjustment leads to an increase in size of the processing circuit 60.

This is because, the difference between the detection area (the former) with the largest light utilization efficiency and the detection area (the latter) with the smallest light utilization efficiency is at most approximately ten times as large as the light utilization efficiency of the latter. Accordingly, the threshold value of the latter differs from the threshold value of the former by approximately $\sqrt{10}$ times of the threshold value of the former. When the difference is divided by several hundred, the divided value is less than or equal to 1% of the maximum threshold value, which is too small to be noticed among variations in circuit constant.

In view of the above, it is practical that a plurality of detection areas (a detection range) are divided into fewer groups (for example, seven groups in the present embodiment) and a threshold voltage is determined for each group. The following describes a method for dividing the detection range into groups and a method for determining a threshold voltage for each group.

Figure 6A:
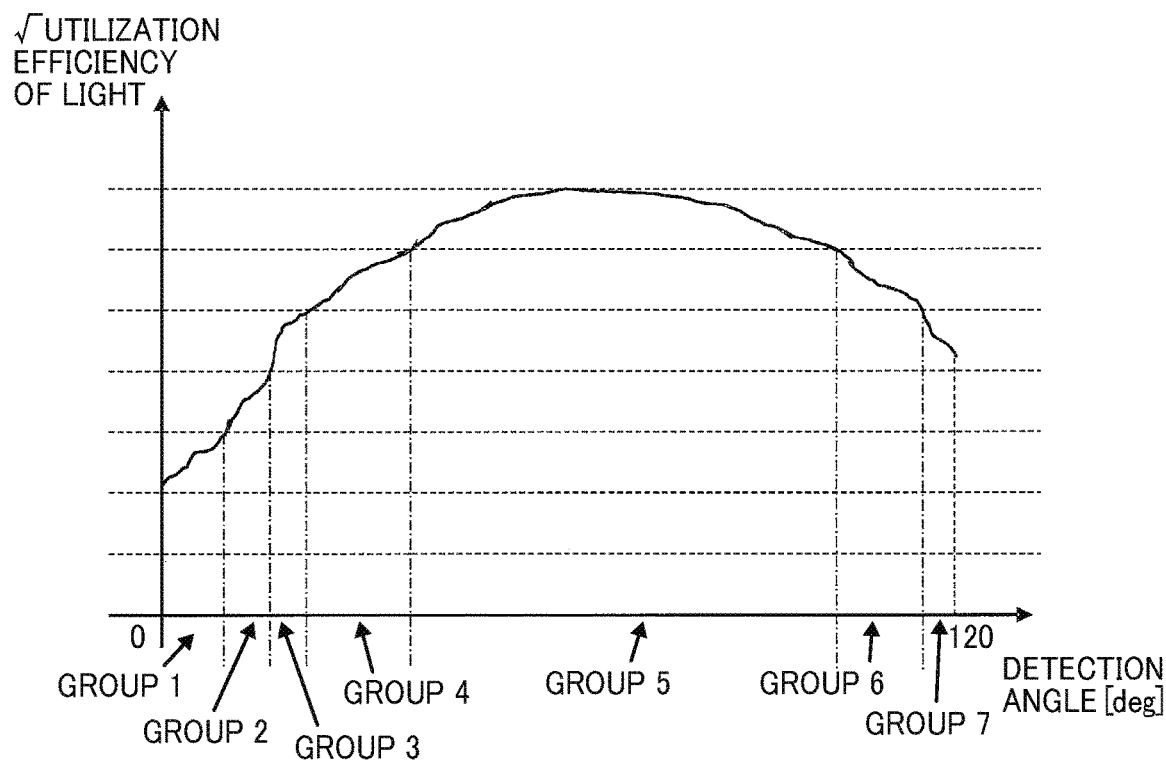
FIGS. 6A and 6B are graphs for describing an example of a method for dividing a plurality of detection areas of a detection range into a plurality of groups.
Figure 6B:
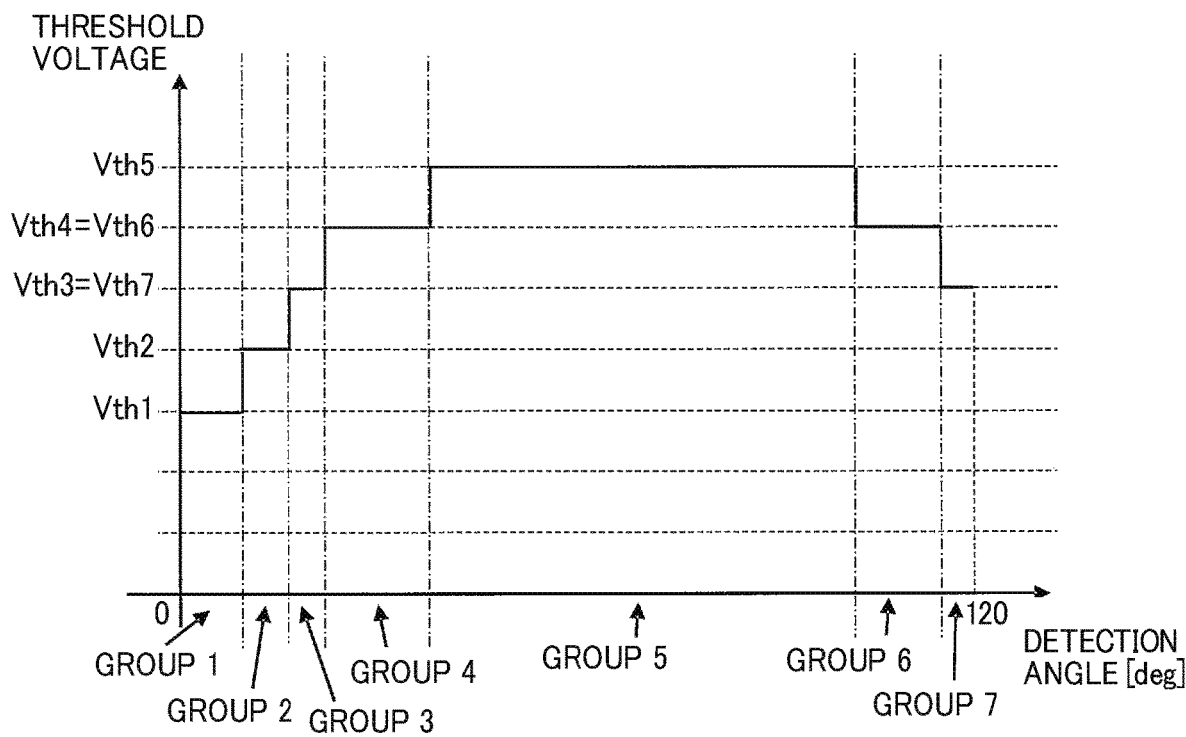

FIG. 6A represents a graph of a change in square root of light utilization efficiency η of the light receiving optical system 30, with detection angle where the detection angle ranges from 0° to 120°. FIG. 6B represents a graph of threshold voltages for the detection angles for groups, respectively. In FIGS. 6A and 6B, broken lines are spaced evenly.

The threshold voltage values Vth1, Vth2, Vth7 correspond to group 1, group 2, . . . group 7.

As illustrated in FIG. 6B, a plurality of detection areas are divided into groups with a detection angle partitioning two adjacent groups where the threshold voltage changes with the detection angle. This configuration enables the detection areas to be effectively divided into groups, thereby favorably determining the threshold voltage.

Figure 7:
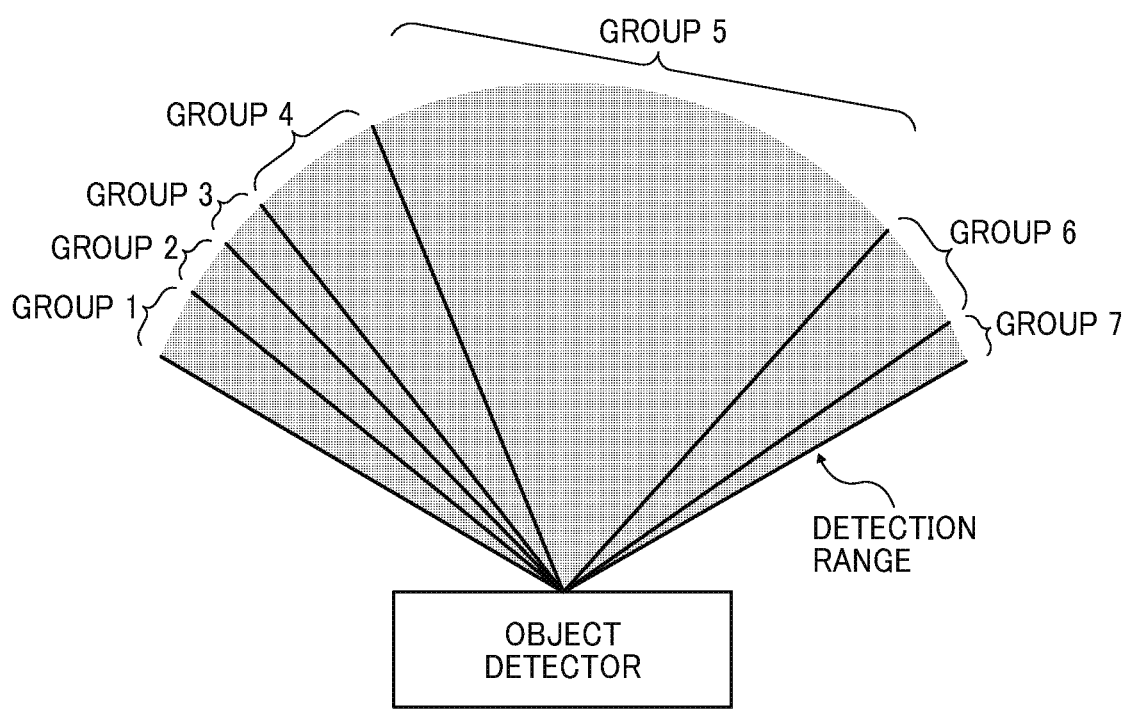
FIG. 7 is an illustration for describing an example of the plurality of groups of the plurality of detection areas of the detection range.

FIG. 7 is an illustration of the plurality of detection areas, which are illustrated in FIG. 6, divided into groups. In FIG. 6, the threshold voltage is determined based on the square root of light utilization efficiency. Alternatively, in some embodiments, the threshold voltage may be determined based on the degree of noise for each detection angle when the object detector 100 emits light with a constant intensity.

In the present embodiment, the plurality of detection areas are divided into seven groups. Alternatively, in some embodiments, the plurality of detection areas may be divided into fewer or more groups than seven as long as the number of groups is less than the number of detection areas. Further, in the present embodiment, the variation width of the threshold voltage is constant, but no limitation is intended hereby. In some embodiments, the variation width of the threshold voltage may not be constant.

Alternatively, in some embodiments, the threshold voltage may be continuously changed in an analog manner. In this case, the detection range may be divided into fewer groups than the number of detection areas to determine different threshold voltage values. Alternatively, the threshold voltage may be changed with light utilization efficiency for each detection area of the light receiving optical system 30.

When a plurality of light-receiving elements, a plurality of light-emitting elements, or the combination thereof are disposed in the object detector 100, a plurality of detection areas are detected as illustrated in FIGS. 4A and 4B. In this case, setting substantially the same light utilization efficiency of the light receiving optical system for each detection area unsuccessfully increases the size of the object detector 100 due to an increase in effective diameter of an optical element, such as a lens or a mirror.

To avoid such circumstances, the light utilization efficiency at an edge of the detection range is reduced as compared to the light utilization efficiency at the center of the detection range, thereby reducing the optical element in size. Further, the threshold value at any edge of the detection range is reduced as compared to the threshold value at the center of the detection range, thereby preventing an increase in erroneous detection probability while preventing a reduction in detection distance at any edge of the detection range due to the downsize of the optical element.

The configuration that emits a laser beam to a scanning device, such as the rotating mirror 26, from the outside of the detection angle range is disadvantageous to increase the detection distance at the edge of the detection range. However, the configuration is advantageous for multi-layer detection that employs a plurality of light-emitting elements.

Thus, such a configuration can exhibit the advantageous effects of the present disclosure. The following describes the reasons for the above. Note that the above-described "multi-layer detection" refers to a detection of the detection range that is divided into a plurality of detection areas in the Z-axis direction as illustrated in FIG. 4C.

Figure 8A:
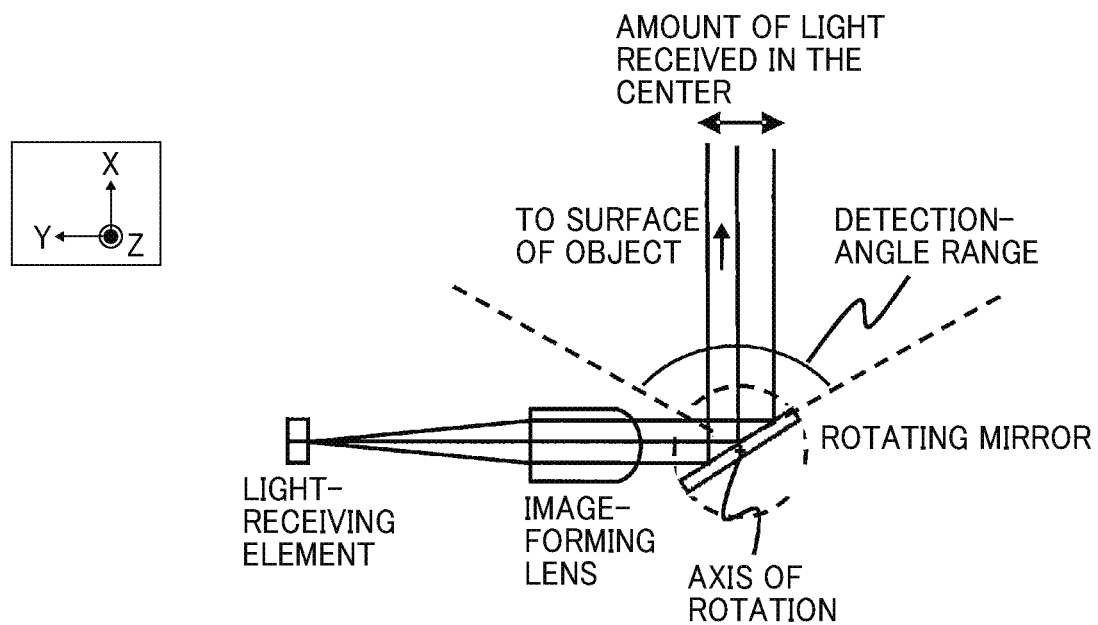
FIG. 8A is an illustration of the amount of received light in emitting light to the center of the detection range.
Figure 8B:
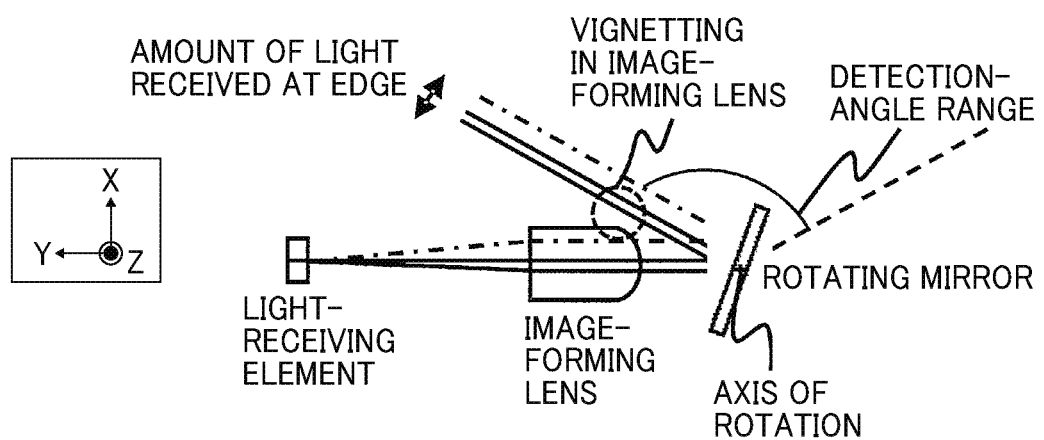
FIG. 8B is an illustration of the amount of received light in emitting light to any edge of the detection range.

In the configuration that emits a laser beam to the scanning device, for example, the rotating mirror 26, from the outside of the detection angle range, vignetting occurs in the image-forming lens during the detection of the edges of the detection range, thereby reducing the light utilization efficiency at any edge of the detection range as compared to the light utilization efficiency at the center of the detection range (see FIGS. 8A and 8B).

In contrast, for example, a rotating mirror having a mirror surface that forms an angle of 45° relative to the Z-axis is rotated around the Z-axis to perform the wide-angle detection with light parallel to the Z-axis. In such a configuration, vignetting of a light beam does not occurs, and thus the light utilization efficiency does not depend on the scanning angle in principle.

In the configuration for the multi-layer detection in which a plurality of of light-emitting elements are disposed along the Z-axis direction and each light-emitting element emits light to a different detection area arranged along the Z-axis direction, the projection beam and the detection area are not distorted in principle when the projection beam is emitted to the scanning device from the outside of the detection angle range.

In contrast, in the configuration that emits a light beam, which is parallel to the rotation axis, to the rotating mirror tilted at 45° relative to the rotation axis, the detection areas are distorted during the multi-layer detection of the plurality of light-emitting elements. In other words, for example, when any overlapping is eliminated between layers of detection (i.e., between the detection areas in the Z-axis direction) at the center of the detection range, the detection areas at any edge of the detection range are distorted, thereby causing adjacent layers of detection (adjacent detection areas) at any edge to overlap with each other.

For the above-described reasons, with the light receiving optical system as illustrated in FIGS. 8A and 8B, the threshold value of an edge of detection rage is reduced as compared to the threshold value of the center of the detection range, thereby allowing for a relatively long distance detection at the edges of the detection range as well. Further, with such a reduction, the detection areas are not distorted in the multi-layer detection, or the object detector can be downsized.

When a plurality of light-emitting elements are unidimensionally arranged along the horizontal direction, the detection range can be horizontally divided into a plurality of detection areas as illustrated in FIGS. 4A and 4B. Further, when a plurality of light-emitting elements are unidimensionally arranged along the vertical direction, the detection range can be vertically divided into a plurality of detection areas as illustrated in FIG. 4C.

Alternatively, the detection range can be two-dimensionally divided into detection areas by arranging a plurality of light-emitting elements two-dimensional or unidimensional manner to emit light for scanning in both the arrangement direction and the vertical direction. Such an arrangement is advantageous for use in a high-resolution detection with a range-finding device and to be used as a three-dimensional sensor.

When a plurality of light-emitting elements are used to divide the detection range in emitting light and one light-receiving element is used to receive the emitted light, the plurality of light-emitting elements are configured to emit light at different timings. With such a configuration, only one received-light signal at one time enters the circuit board with the light-receiving element and the processing circuit. Accordingly, the received-light signal does not include crosstalk, and thus successful object detection can be achieved.

In contrast, when a plurality of light-receiving elements are used to divide the detection range in receiving light and one light-emitting element is used to emit light, the plurality of light-receiving elements receive light at the same time. With such a configuration, received-light signals are transmitted through the circuit board at the same time, and thereby crosstalk might generate between the received-light signals.

When the detection range is divided by a plurality of light-emitting elements in emitting light and by a plurality of light-receiving elements in receiving light, fewer light-receiving element are used as compared to the case in which the detection range is divided only by a plurality of light-receiving elements in receiving light (assuming that the detection range is divided to the same number of detection areas between both cases). Thus, crosstalk between received-light signals decreases, which is advantageous for object detection.

Figure 9:
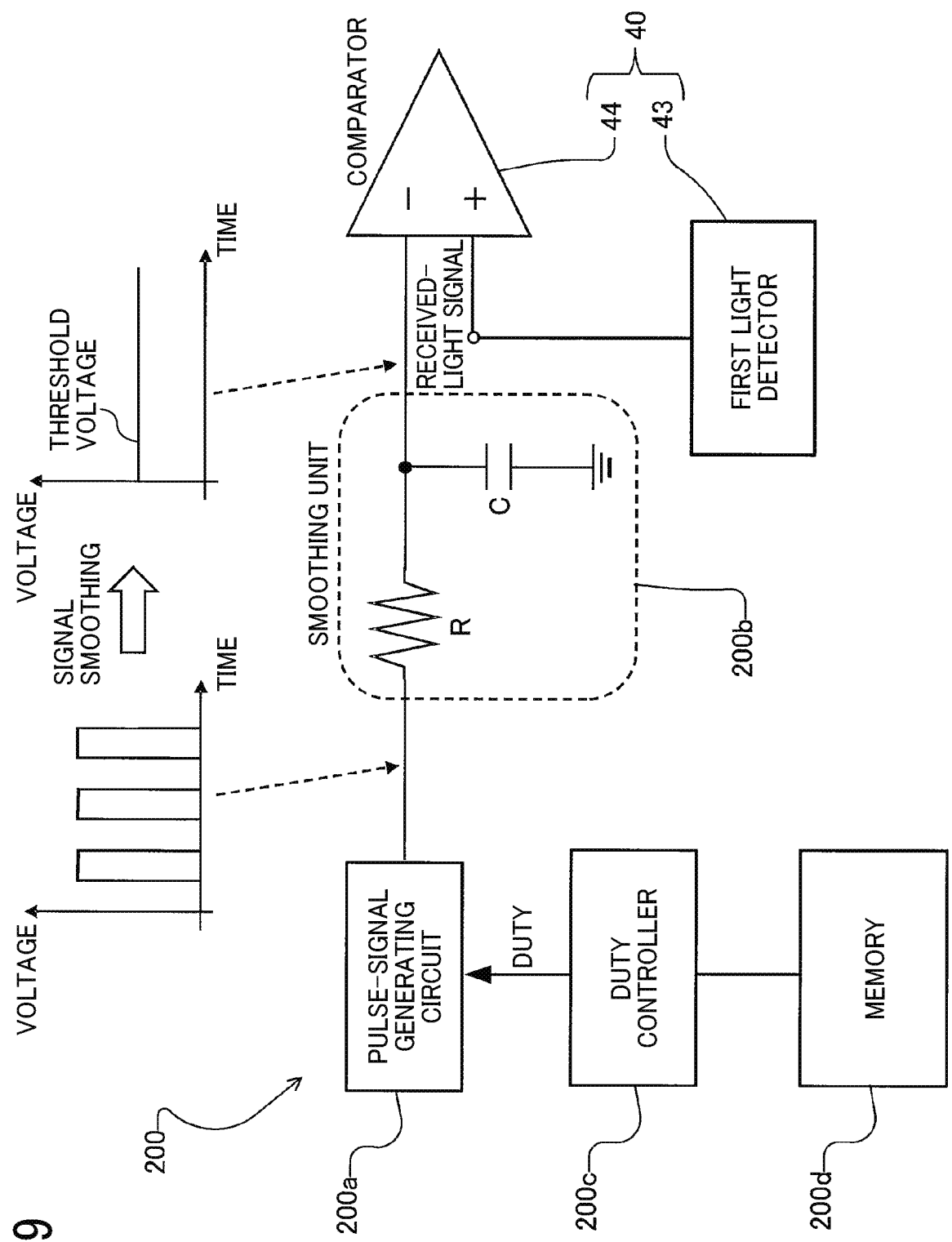
FIG. 9 is an illustration for describing a method for setting a threshold voltage using a voltage adjuster.

FIG. 9 is an illustration of a voltage adjuster 200 as a threshold adjuster to set a threshold voltage for each detection area or for each group in the object detector 100. The voltage adjuster 200 may be implemented by, for example, a circuit.

The voltage adjuster 200 includes a pulse-signal generating circuit 200a, a smoothing unit 200b, a duty controller 200c, and a memory 200d. The pulse-signal generating circuit 200a generates a pulse signal including a plurality of pulses, each pulse variable in a duty ratio. The smoothing unit 200b smooths the generated pulse signal. The duty controller 200c controls the duty ratio of the pulse signal. The memory 200d stores a table (hereinafter, referred to as a duty-ratio table) for duty ratios that correspond to threshold voltages preliminarily set for detection areas or groups, respectively. In the present embodiment, the duty controller 200c receives a synchronization signal output from the synchronous system 50.

The following describes a method in which the voltage adjuster 200 sets a threshold value according to a detection area or a group, referring to FIG. 9. Firstly, the duty controller 200c detects a scanning position of a light beam based on a synchronization signal output from the synchronous system 50. Subsequently, the duty controller 200c selects a duty ratio from the duty ratios in the duty-ratio table stored in the memory 200d, based on the detected position. The duty controller 200c outputs, to the pulse-signal generating circuit 200a, the selected duty ratio for scanning a detection area or a group that corresponds to the selected duty ratio. The pulse-signal generating circuit 200a having received the duty ratio from the duty controller 200c generates a pulse signal including a plurality pulses each having the received duty ratio, and outputs the generated pulse signal to the smoothing unit 200b. The smoothing unit 200b smooths the pulse signal output from the pulse-signal generating circuit 200a. The smoothed pulse signal is used as a threshold voltage. As described above, the duty controller 200c of the voltage adjuster 200 controls the duty ratio of a pulse signal to be generated by the pulse-signal generating circuit 200a, thereby obtaining different threshold values between the detection areas or groups.

Referring back to FIG. 9, the smoothing unit 200b outputs the smoothed pulse signal, i.e., a threshold value, to an input end (the negative terminal) of a comparator as the first binarizing circuit 44. The comparator compares the threshold voltage input to the negative terminal with a received-light signal input to the other input end (the positive terminal), and outputs a binarized signal (a detected signal) at a timing at which the received-light signal traverses the threshold voltage.

The smoothing unit 200b may be an integration circuit, such as a resistance capacitor (RC) low pass filter that includes a resistor R and a capacitor C. The pulse-signal generating circuit 200a may be, for example, a field-programmable gate array (FPGA) as an integration circuit. The FPGA is also used as a control circuit, e.g., the measurement controller 46. Thus, an increase in size of circuit can be prevented and such a circuit is easily achieved. In some embodiments, the pulse-signal generating circuit 200a may be any circuit other than the FPGA.

In the above description, the method for setting a threshold voltage is applied in a scanning object detector. The same configuration of the voltage adjuster 200 in FIG. 9 is applicable in a non-scanning object detector.

In this case, when a detection range is divided by a plurality of (the same as the number of detection areas or groups) light-emitting elements, e.g., LDs, only in emitting light, the voltage adjuster 200 generates a pulse signal having a duty ratio set for the corresponding detection area and smooths the generated pulse signal, thus setting the threshold voltage according to the detection area, in emitting light of any light-emitting element for each detection area or each group.

In such a case, when fewer (at least one) light-receiving elements, e.g., PDs than the number of the light-emitting elements receive light, at least two light-emitting elements emit light at different timings. In such a configuration, a lighting trigger signal for each light-emitting element is preferably input to a drive circuit for light-emitting element as well as the duty controller 200c.

In contrast, when the same number of light-receiving elements as the number of the light-emitting elements receive light, all of the light-emitting elements can emit light at the same time. Note that, when a plurality of light-receiving elements corresponds to the same light-emitting element, a binarizing circuit is preferably disposed for each light-receiving element because the plurality of light-receiving elements simultaneously receives light emitted from the light-emitting element.

Further, when the detection range is divided by a plurality of light-receiving elements such as PDs in receiving light while a single light-emitting element, such as an LD, is used to emit diverging light, the voltage adjuster 200 generates a pulse signal having a duty ratio set for each detection area and smooths the generated pulse signal, thus setting a threshold voltage according to the detection area, upon the light-emitting element emitting light. Note that, a binarizing circuit is preferably disposed for each light-receiving element because the plurality of light-receiving elements simultaneously receives light emitted from one light-emitting element.

Second Example

The following describes a second example in which a single light-emitting element emits a diverging light beam to an object and three light detectors LD1, LD2, and LD3 receive the light beam reflected from the object, dividing a detection range into three detection areas D1, D2, and D3, in the same manner as in the first example (see FIG. 4A).

The light detectors LD1, LD2, and LD3 have sensitivity (hereinafter, referred to as "detection sensitivity") S1, S2, and S3, respectively. Note that the sensitivity of each light detector LD1, LD2, and LD3 includes both the sensitivity of the light-receiving element and the amplification factor of a signal of the processing circuit 60.

As described above, the degree of shot noise is proportional to the square root of light utilization efficiency as well as to the degree of sensitivity S1, S2, and S3 of the light detectors LD1, LD2, and LD3. Accordingly, the following relations are satisfied: σ1 is proportional to the product of S1 and the square root of η1, σ2 is proportional to the product of S2 and the square root of η2, and σ3 is proportional to the product of S3 and the square root of η3 where σ1, σ2, and σ3 represent the degrees of noise of received-light signals RS1, RS2, and RS3 of the light detectors LD1, LD2, and LD3, respectively.

In the present example, the following relations are determined: σ1 is proportional to half the square root of η1, σ2 is proportional to half the square root of η2, and σ3 is proportional to half the square root of η3. Accordingly, the threshold voltage is set the same over the entire detection areas so that the ratio of a threshold voltage relative to the standard deviation of noise is constant irrespective of the detection area. This configuration is most advantageous from the viewpoint of preventing an increase in erroneous detection probability and maximizing a detection distance.

FIGS. 10A-1, 10A-2, and 10A-3 are waveform charts of received-light signals from the light detectors LD1, LD2, and LD3, respectively each having the same detection sensitivity over the entire detection areas. FIGS. 10B-1, 10B-2, and 10B-3 are waveform charts of received-light signals from the light detectors LD1, LD2, and LD3, respectively each having a different detection sensitivity for each detection area.

As a method for changing the sensitivity of the light detector with a detection area, a device that is capable of changing an amplification factor may be used as the signal amplifier 60b of the processing circuit 60, to control the amplification factor. Alternatively, the APD to change the level of the light-receiving sensitivity with an applied voltage may be used for the light-receiving element to control a voltage to be applied.

More specifically, the object detector 100 employs a detection-sensitivity adjuster (a sensitivity adjuster) to adjust detection sensitivity for each detection area or for each group.

The detection-sensitivity adjuster includes an amplification factor controller, which is capable of changing an amplification factor, to control an amplification factor of the signal amplifier. Alternatively, when the APD is used for the light-receiving element to change the light-receiving sensitivity with an applied voltage, the detection-sensitivity adjuster includes a voltage controller to control a voltage to be applied to the APD. In this case, a table is stored in the memory 200d, listing the amplification factors of the signal amplifier or the values of voltage to be applied to the APD, which are preliminarily determined for each detection area or for each group.

The following describes a method in which the detection sensitivity adjuster determines the degree of detection sensitivity. Firstly, the detection sensitivity adjuster detects a scanning position of a light beam based on a synchronization signal output from the synchronous system 50, and determines an amplification factor of the signal amplifier 60b by selecting an amplification factor for each detection area or each group referring to the table at the time of scanning each detection area or each group. Alternatively, the detection sensitivity adjuster detects a scanning position of a light beam based on a synchronization signal output from the synchronous system 50, and determines a value of voltage to be applied to the APD by selecting a voltage value for each detection area or each group referring to the table at the time of scanning each detection area or each group. Accordingly, the degree of detection sensitivity differs between detection areas or groups.

In the above description, the method for setting the degree of detection sensitivity is applied in a scanning object detector 100. The same configuration of the detection sensitivity adjuster is applicable in a non-scanning object detector.

In this case, when a detection range is divided by a plurality of (the same as the number of detection areas or groups) light-emitting elements, e.g., LDs, in emitting light, the detection sensitivity adjuster determines an amplification factor of the signal amplifier 60b by selecting an amplification factor for each detection area or each group from the data listed in the table, in emitting light of any light-emitting element for each detection area or each group. Alternatively, the detection sensitivity adjuster determines a value of voltage to be applied to the APD by selecting a voltage value for each detection area or each group from data listed in the table, in emitting light of any light-emitting element for each detection area or each group. Accordingly, the degree of detection sensitivity differs between detection areas or groups.

In such a case, when fewer (at least one) light-receiving elements than the number of the light-emitting elements receive light, at least two light-emitting elements emit light at different timings. In such a configuration, a lighting trigger signal for each light-emitting element is preferably input to a drive circuit for light-emitting element as well as the detection sensitivity adjuster.

In contrast, when the same number of light-receiving elements as the number of the light-emitting elements receive light, all of the light-emitting elements can emit light at the same time. Note that, when a plurality of light-receiving elements corresponds to the same light-emitting element, a binarizing circuit is preferably disposed for each light-receiving element.

Further, when the detection range is divided by a plurality of light-receiving elements such as PDs in receiving light while a single light-emitting element, such as an LD, is used to emit diverging light, the detection sensitivity adjuster determines an amplification factor of the signal amplifier 60b by selecting an amplification factor for each detection area or each group from the data listed in the table, in emitting light of the light-emitting element for each detection area or each group. Alternatively, the detection sensitivity adjuster determines a value of voltage to be applied to the APD by selecting a voltage value for each detection area or each group from data listed in the table, in emitting light of the light-emitting element for each detection area or each group. Note that, a binarizing circuit is preferably disposed for each light-receiving element because the plurality of light-receiving elements simultaneously receives light emitted from one light-emitting element.

When the detection range is divided by a plurality of light-receiving element in receiving light, the light-receiving elements may have different degrees of detection sensitivity corresponding to the detection areas, respectively. In such a case, the degree of detection sensitivity can be changed with a detection area using only the light-receiving elements, so that no detection sensitivity adjuster is employed.

Despite the above-described most ideal method for determining the detection sensitivity of each light detector, the advantageous effects (to prevent an erroneous detection and achieve a long-range detection) can be achieved by satisfying the relation that increases the detection sensitivity of a light detector in a detection area with a small noise as compared to another detection area with a large noise. That is, the advantageous effects can be obtained with more uneven parameters or without the parameters as illustrated in FIGS. 10A-1 through 10B-3.

In a method that detects a plurality of detection areas by scanning the detection range with a laser beam, high angular resolution in the scanning direction can be achieved. Thus, the number of divisions of the detection range might range from several hundred to several thousand. As a method for determining different degrees of detection sensitivity for the detection areas, the level of the light-receiving sensitivity may be changed with discrete values, for example by changing the amplification factor of the signal amplifier or the level of the sensitivity of the light-receiving element in a step manner. In this case, the detection sensitivity may be determined for each detection area so that the degrees of detection sensitivity correspond to the detection areas, respectively. This method, however, fails to exhibit any advantageous effects because finely adjusting the threshold value is meaningless in a practical use and such an adjustment leads to an increase in size of the processing circuit 60.

This is because, the difference between the detection area (the former) with the largest light utilization efficiency and the detection area (the latter) with the smallest light utilization efficiency is at most approximately ten times as large as the light utilization efficiency of the latter. Accordingly, the detection sensitivity of the latter differs from the detection sensitivity of the former by approximately $\sqrt{10}$ times of the detection sensitivity of the former. When the difference is divided by several hundred, the divided value is less than or equal to 1% of the maximum detection sensitivity, which is too small to be noticed among variations in circuit constant.

In this case as well, it is practical that a plurality of (in the present example, nine or more) detection areas are divided into fewer groups (in the present example, eight groups) and the degree of detection sensitivity is determined for each group. The same methods for dividing the detection range into groups and for determining a degree of detection sensitivity for each group are applicable in the second example as in the first example. The following describes a method for determining the degree of detection sensitivity.

Figure 11A:
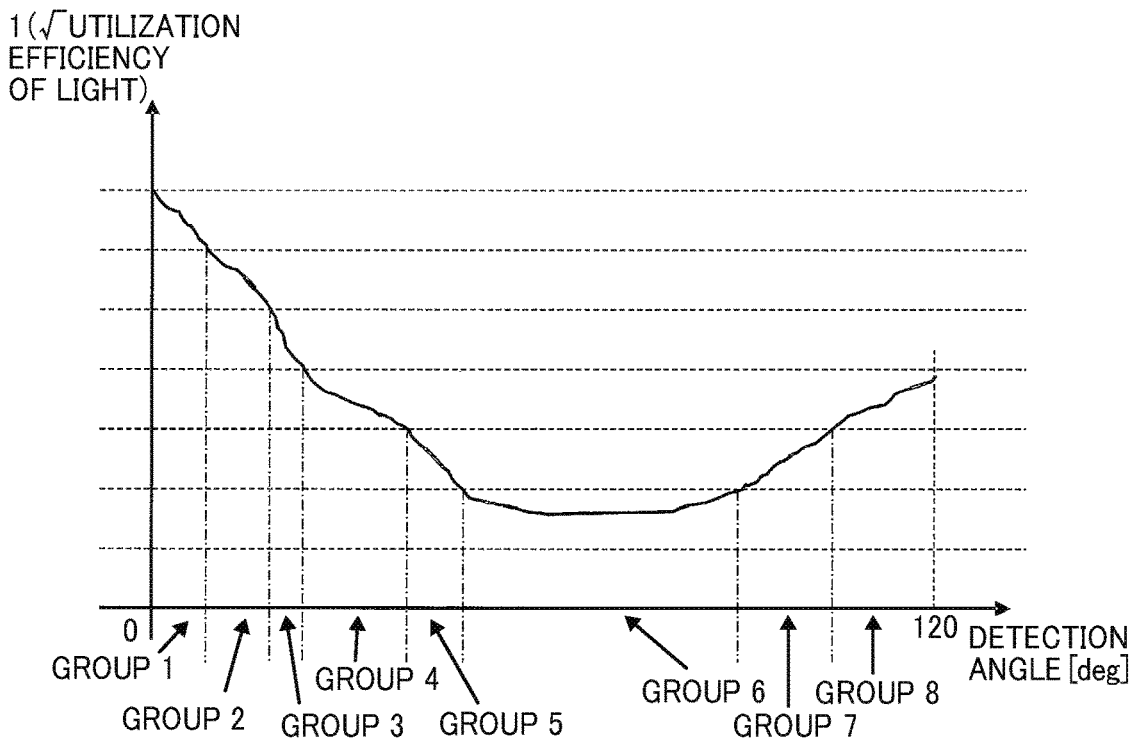
FIGS. 11A and 11B are graphs for describing another example of a method for dividing a plurality of detection areas of a detection range into a plurality of groups.
Figure 11B:
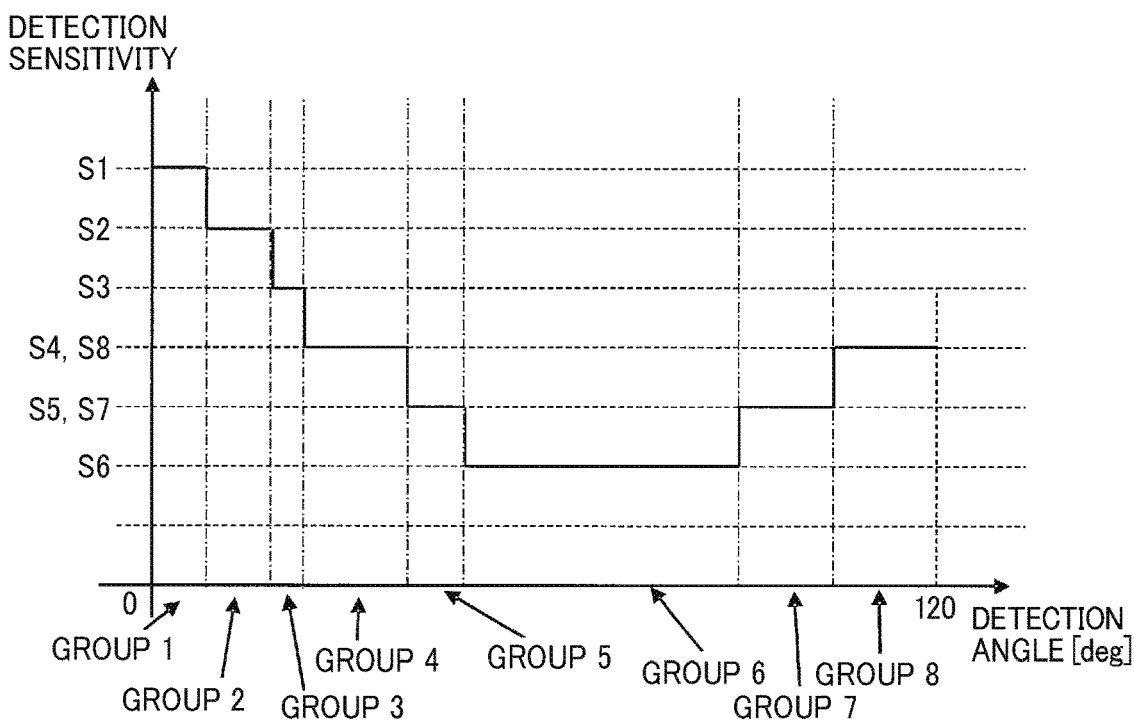

FIG. 11A represents a graph of a change in a reciprocal of the square root of light utilization efficiency η of the light receiving optical system 30, with detection angle where the detection angle ranges from 0° to 120°. FIG. 11B represents a graph of the degree of detection sensitivity set for each group (a degree of detection sensitivity for each detection angle). In FIGS. 11A and 11B, broken lines are spaced evenly.

The detection sensitivity degrees S1, S2, . . . S8 correspond to group 1, group 2, . . . group 8.

Figure 12:
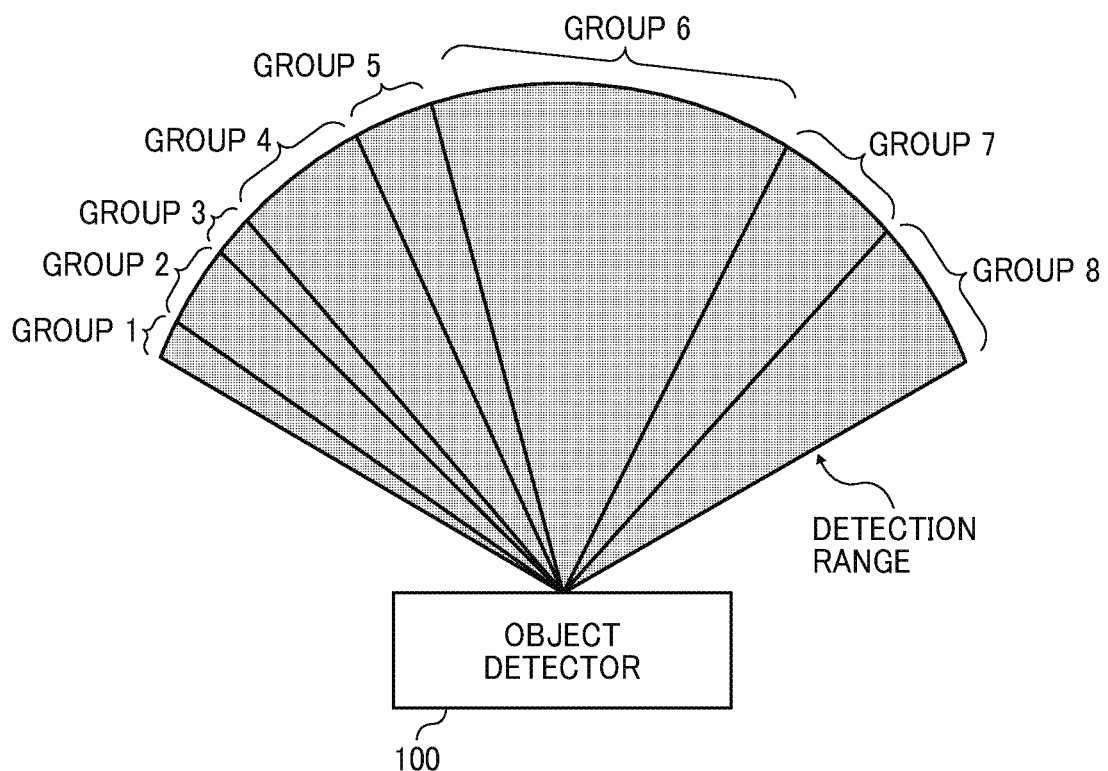
FIG. 12 is an illustration for describing another example of the plurality of groups of the plurality of detection areas of the detection range.

FIG. 12 represents groups 1 through 8 illustrated in FIG. 11. As illustrated in FIGS. 11A and 11B, a plurality of detection areas are divided into groups with a detection angle partitioning two adjacent groups where the detection sensitivity changes with the detection angle. This configuration enables effectively dividing the detection areas into groups as well as determining the detection sensitivity.

In FIGS. 11A and 11B, the detection sensitivity is determined based on the reciprocal of the square root of light utilization efficiency. Alternatively, in some embodiments, the detection sensitivity may be determined based on the degree of noise for each detection angle when the object detector 100 emits light with a constant intensity.

In the present embodiment, the plurality of detection areas are divided into eight groups. Alternatively, in some embodiments, the plurality of detection areas may be divided into fewer or more groups than eight as long as the number of groups is less than the number of detection areas.

Further, in the present embodiment, the variation width of the detection sensitivity is constant, but no limitation is intended hereby. In some embodiments, the variation width of the detection sensitivity may not be constant. Alternatively, in some embodiments, the threshold voltage may be continuously changed in an analog manner. In this case, the detection range may be divided into fewer groups than the number of detection areas to determine different degrees of detection sensitivity between the groups. Alternatively, the degree of detection sensitivity may be changed with light utilization efficiency for each detection area or each group.

As described above, the light utilization efficiency at any edge of the detection range is reduced as compared to the light utilization efficiency at the center of the detection range, thereby reducing the optical element in size. Further, the detection sensitivity at any edge of the detection range is increased as compared to the threshold value at the center of the detection range, thereby preventing an increase in erroneous detection probability while preventing a reduction in detection distance at any edge of the detection range due to the downsize of the optical element.

This configuration is advantageous for the multi-layer detection. An object detector with a relatively long detection distance at any edge of the detection range and no distortion of the detection areas in the multi-layer detection can be achieved by combining the configuration of the above-described optical element with the configuration of the determination of detection sensitivity (the detection sensitivity at edges of the detection range is increased as compared to the center of the detection range).

From the first viewpoint (the threshold voltage), the above-described object detector 100 according to the present embodiment includes the light-emitting system 10, the first light detector 43 (sometimes simply referred to as the light detector), the first binarizing circuit 44, and the voltage adjuster 200. The first light detector 43 receives light emitted from the light-emitting system 10 and reflected or scattered by an object. The first binarizing circuit 44 (a signal detector) receives and detects a received-light signal (an output signal) from the first light detector 43 based on the threshold voltage. The voltage adjuster 200 changes the threshold voltage between when the light-emitting system 10 emits light to a part of a light-emission range (a detection range) of the light-emitting system 10 and when the light-emitting system 10 emits light to another part of the light-emission range.

This configuration changes the threshold voltage between a plurality of areas of the light-emission range according to, for example, light utilization efficiency for each area. Thus, a reduction in detection distance due to an excessively increased threshold voltage relative to noise included in a received-light signal can be prevented.

Thus, such a configuration can prevent a reduction in detection distance within the light-emission range.

For example, the threshold voltage is increased in an area with a greater light utilization efficiency due to increased disturbance light and noise. Accordingly, a reduction in detection distance as well as an erroneous detection can be prevented. For example, the threshold voltage is reduced in an area with a lower light utilization efficiency due to reduced disturbance light and noise. Accordingly, a reduction in detection distance as well as an erroneous detection can be prevented.

Setting a threshold voltage according to an area of the light-emission range can be achieved through a preliminarily determined sequence control, and thus such a setting operation is easily achieved without any feedback control, exhibiting the advantageous effects reliably.

The object detector 100 further includes the light receiving optical system 30 to guide light reflected by an object to the first light detector 43. In the light receiving optical system 30, the light utilization efficiency of light emitted to any edge of the light-emission range is lower than the light utilization efficiency of light emitted to the center of the light-emission rang. In the object detector 100, the voltage adjuster 200 preferably sets a threshold voltage to be lower in emitting light to any edge of the light-emission range than in emitting light to the center of the light-emission range.

This configuration can achieve an object detector that is advantageous for a wide-angle multi-layer detection. In non-scanning object detectors as well, reducing the light utilization efficiency at any edge of the detection range as compared to the light utilization efficiency at the center of the detection range can reduce the effective diameter of the optical element, thus downsizing the object detector. Further, reducing the threshold value at any edge of the detection range as compared to the threshold value at the center of the detection range can prevent a reduction in detection distance due to the downsizing of the object detector.

The light-emitting system 10 includes a light source, e.g., the LD 111, a scanning device, e.g., the rotating mirror 26 to scan the light-emission range with light emitted from the light source. In this case, a threshold voltage is preferably set according to an angle at which the scanning device scans the light-emission range with the light.

The light-emitting system 10 preferably employs an incident optical system (a projection optical system 20) to cause the light emitted from the light source to enter the scanning device from the outside of the light-emission range.

In the configuration that makes a light beam enter the scanning device from the outside of the light-emission range (scanning angle range), vignetting occurs at the edges of the light-emission range (any edge of the scanning angle range), and thereby the light utilization efficiency significantly varies with the scanning angle. In such a case, the advantageous effects of the present disclosure is significantly exhibited. The above-described configuration is particularly advantageous for cases where a plurality of light-emitting elements are vertically disposed having a vertically-variable resolution.

For example, in a configuration that makes a light beam enter a rotating mirror (having a mirror surface that forms an angle of 45° relative to the vertical direction) from above, the light utilization efficiency is less likely to depend on the scanning angle. However, when a vertically-variable resolution is given to a plurality of light-emitting elements in such a configuration, a plurality of light beams, which are vertically separated from each other, overlaps with each other after reflected by the mirror, resulting in failure of a successful multi-layer detection in a vertical direction.

Further, the light-emitting system 10 preferably includes a light source that includes a plurality of light-emitting elements to divide a light-emission range into a plurality of detection areas for detection.

This configuration that divides the light-emission range into areas using a plurality of light-emitting elements employs fewer light-receiving elements than cases where the light-emission range is divided into area using a plurality of light-receiving elements. Accordingly, crosstalk in a received-light signal decreases in the configuration, thus increasing the accuracy of the detection.

In some embodiments, the object detector 100 may include a plurality of first light detectors 43 to divide the light-emission range into a plurality of detection areas.

Preferably, a plurality of detection areas is divided into fewer groups than the number of detection areas. The voltage adjuster 200 preferably makes the threshold voltage different from each other between groups.

Particularly in the scanning-object detector, the detection range might be divided into several hundred to several thousand detection areas. However, dividing the detection range into a small number of groups while using a small number of discrete values of threshold voltage can prevent an increase in size of circuit as well as effectively increase the detection distance in areas having a lower light utilization efficiency.

The voltage adjuster 200 includes a pulse-signal generating circuit 200a, a smoothing unit 200b, and a duty controller 200c. The pulse-signal generating circuit 200a generates a pulse signal that is variable in duty ratio. The smoothing unit 200b smooths the generated pulse signal. The duty controller 200c controls a duty ratio of the pulse signal.

The configuration of the smoothing unit 200b is easily achieved by using the RC low pass filter, and a control circuit may be used as the pulse-signal generating circuit 200a that is capable of changing a duty ratio of the pulse signal. Accordingly, any voltage-variable direct-current power source may not be used for controlling the threshold voltage, which is advantageous in a reduction in cost and size.

Note that, in some embodiments, a voltage-variable direct-current power source may be used as the voltage adjuster 200.

From the second viewpoint (the detection sensitivity), the object detector 100 according to the present embodiment includes the light-emitting system 10, the first light detector 43, and the first binarizing circuit 44. The first light detector 43 includes a light-receiving element that receives light emitted from the light-emitting system 10 and reflected or scattered by an object. The first binarizing circuit 44 (a signal detector) receives an output signal (a received-light signal) from the first light detector 43 to detect the output signal based on a threshold value. The first light detector 43 changes a degree of detection sensitivity between when the light-emitting system 10 emits light to a part of a light-emission range of the light-emitting system 10 and when the light-emitting system 10 emits light to another part of the light-emission range.

In this case, for example, the light-receiving sensitivity of the light-receiving element or the amplification factor of the signal amplifier 60b are made different from each other between detection areas in the first light detector 43. Accordingly, the relation of the threshold voltage and the noise level can approximate a desired relation. Thus, such a configuration can prevent a reduction in detection distance within the light-emission range.

The object detector 100 further includes the light receiving optical system 30 to guide light reflected by an object to the first light detector 43. In the light receiving optical system 30, the light utilization efficiency in emitting light to any edge of the light-emission range is lower than in emitting light to the center of the light-emission range. In the object detector 100, the detection sensitivity is preferably greater in emitting light to any edge of the light-emission range than in emitting light to the center of the light-emission range.

This configuration can achieve an object detector that is advantageous for a wide-angle multi-layer detection. In non-scanning object detectors as well, reducing the light utilization efficiency at any edge of the detection range as compared to the light utilization efficiency at the center of the detection range can reduce the effective diameter of the optical element, thus downsizing the object detector. Further, reducing the detection sensitivity at any edge of the detection range as compared to the detection sensitivity at the center of the detection range can prevent a reduction in detection distance due to the downsizing of the object detector.

The light-emitting system 10 includes a light source, e.g., the LD 111, a scanning device, e.g., the rotating mirror 26 to scan the light-emission range with light emitted from the light source. In this case, a detection sensitivity is preferably set according to an angle at which the scanning device scans the light-emission range with the light.

The light-emitting system 10 preferably employs an incident optical system to cause the light emitted from the light source to enter the scanning device from the outside of the light-emission range.

In the configuration that makes a light beam enter the scanning device from the outside of the light-emission range (scanning angle range), vignetting occurs at the edges of the light-emission range (any edge of the scanning angle range), and thereby the light utilization efficiency significantly varies with the scanning angle. Thus, such a configuration can exhibit the advantageous effects of the present disclosure. The above-described configuration is particularly advantageous for cases where a plurality of light-emitting elements is vertically disposed having a vertically-variable resolution.

Further, the light-emitting system 10 may include a light source that includes a plurality of light-emitting elements to divide a light-emission range into a plurality of detection areas for detection.

This configuration that divides the light-emission range into areas using a plurality of light-emitting elements employs fewer light-receiving elements than cases where the light-emission range is divided into area using a plurality of light-receiving elements. Accordingly, in such a configuration, crosstalk in a received-light signal decreases, thus increasing the accuracy of the detection.

In some embodiments, a plurality of first light detectors 43 may be disposed to divide the light-emission range into a plurality of detection areas for detection. In this case, at least two (light-receiving elements) of the plurality of first light detectors 43 may differ in light-receiving sensitivity.

In such a case, the degree of detection sensitivity can be determined according to a detection area of the light-emission range by using only the light-receiving elements, so that no detection sensitivity adjuster is employed.

Preferably, a plurality of detection areas are divided into fewer groups than the number of detection areas. The degree of detection sensitivity preferably differ between groups.

Particularly in the scanning-object detector, the detection range might be divided into several hundred to several thousand detection areas. However, dividing the detection range into a small number of groups while using a small number of discrete values of the threshold voltage can prevent increasing the size of a circuit as well as effectively increase the detection distance in areas having a lower light utilization efficiency.

The first light detector 43 further includes a signal amplifier 60b (a signal amplifying device) capable of changing an amplification factor to amplify a voltage signal according to an output electric current of the light-receiving element. The object detector 100 may further include a detection sensitivity adjuster (a sensitivity adjuster) to adjust the amplification factor of the signal amplifier 60b to change the degree of detection sensitivity.

The light-receiving element of the first light detector 43 may further include a detection sensitivity adjuster (a sensitivity adjuster) to change the level of the light-receiving sensitivity according to an applied voltage to control an applied voltage, thus changing the degree of detection sensitivity.

Preferably, the object detector 100 further includes a calculator that includes the time measuring device 45 and the measurement controller 46. The calculator calculates a distance to an object based on the light-emitting timing of the light source and the light-receiving timing of the first light detector 43. This configuration can accurately determine the distance to an object within the light-emission range.

According to the mobile apparatus 600 including the object detector 100 and the mobile object 400 equipped with the object detector 100, a reduction in detection distance within the projection range (effective scan area) can be prevented, thus providing a mobile apparatus with an excellent safety.

Figure 13:
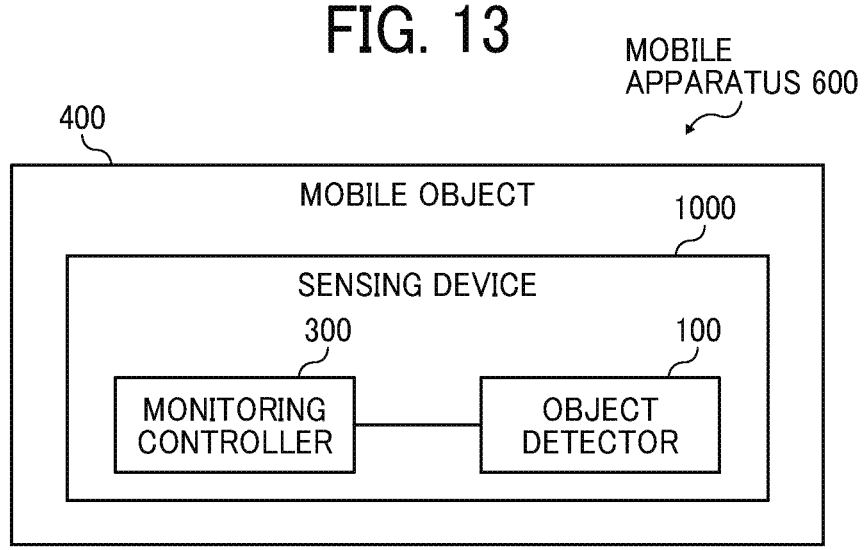
FIG. 13 is an illustration of a sensing device.

FIG. 13 is an illustration of a sensing device 1000 equipped with the object detector 100. The sensing device 1000, which is mounted on a mobile object 400, includes the object detector 100 and a monitoring controller 300 electrically connected to the object detector 100. The object detector 100 is mounted near a bumper or a rear-view mirror in a vehicle (the mobile object 400). The monitoring controller 300, based on the detection results of the object detector 100, estimates the size or shape of an object, and calculates the position and movement data of the object, recognizing the type of the object. The monitoring controller 300 ultimately judges presence of danger. The monitoring controller 300 having made an affirmative judgment alerts an operator of the mobile object 400 to the danger. Alternatively, the monitoring controller 300 having an affirmative judgment issues an order to a steering controller of the mobile object 400 to avoid the danger by steering, or issues an order to the ECU to brake the mobile object 400. Note that the sensing device 1000 receives power supply from a vehicle battery, for example. The monitoring controller 300 may be implemented by, for example, a central processing unit (CPU) or a control circuit.

Further, the monitoring controller 300 may be integrated with the object detector 100. Alternatively, in some embodiment, the monitoring controller 300 may be separate from the object detector 100. In some embodiments, the monitoring controller 300 may perform at least some of the control function of the ECU.

The sensing device 1000 according to the present embodiment includes the object detector 100 and the monitoring controller 300. The monitoring controller 300, in response to the output of the object detector 100, obtain object data (at least one of the presence of an object, the position of the object, the direction of movement of the object, and the speed of movement of the object). With this configuration, the sensing device 1000 reliably and accurately obtains the object data.

The sensing device 1000 is mounted on the mobile object 400. The monitoring controller 300, based on at least one of the position data and the movement data of the object, judges the presence of danger, thereby providing effective data for avoiding danger to an operational control system and a speed control system of a mobile object 400, for example.

Further, according to the mobile apparatus 600 including the mobile object 400 and the sensing device 1000 mounted on the object detector 100 or the mobile object 400, an excellent safety against impact can be provided.

[Variation of Object Detector]

Figure 14:
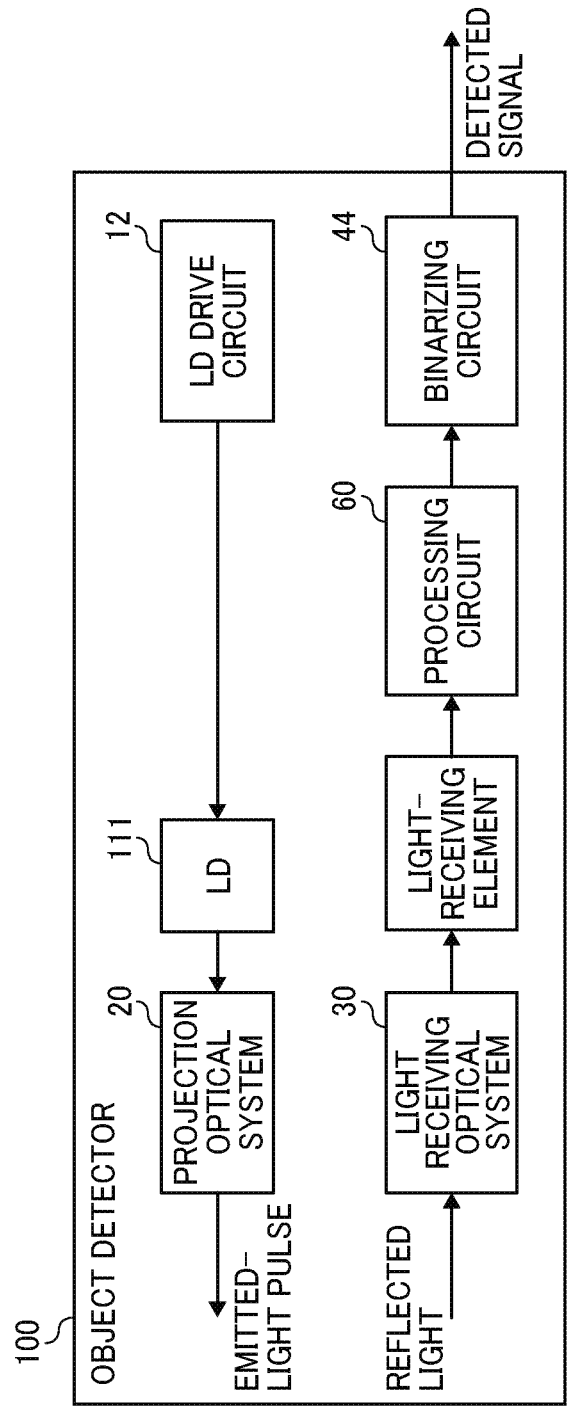
FIG. 14 is a block diagram of a configuration of an object detector according to a variation of the present disclosure.

FIG. 14 is a block diagram of a schematic configuration of the object detector 100 according to a variation. The object detector 100 according to the present variation includes the LD 111, the projection optical system 20, the LD drive device 12, the light receiving optical system 30, the light-receiving element (PD or APD), the processing circuit (waveform processing circuit) 60, and the binarizing circuit 44. That is, in the present variation, the object detector 100 may not include the time measuring device 45, the measurement controller 46, the object recognizer 47, and the synchronous system 50. Note that the synchronous system 50 is used in a scanning object detector, but not used in a non-scanning object detector.

The object detector 100 according to the present variation also has the same configuration to determine the threshold voltage or the detection sensitivity according to a detection area, as in the object detector 100 according to the above-described embodiment. That is, the object detector 100 according to the present variation includes, for example, a voltage adjuster 200, a detection adjuster, or a plurality of light-receiving elements having different degrees of light-receptive sensitivity.

According to the above-described embodiment, an LD is used as a light source. However, the present disclosure is not limited to this configuration. In some embodiment, other types of light emitting elements, such as vertical-cavity surface-emitting lasers (VCSELs), organic electroluminescence (EL) elements and LEDs, may be employed as a light source.

The processing circuit 60 may include only a current-voltage converter 60a. Alternatively, the processing circuit 60 may include a current-voltage converter 60a and a high-pass filter 60c. In other words, the processing circuit 60 may not include a signal amplifier.

The projection optical system 20 may not include the coupling lens 22. Alternatively, the projection optical system 20 may include another type of lens.

The projection optical system 20 and the light receiving optical system 30 may not include the reflection mirror 24. That is, light emitted from the LD 111 may enter the rotating mirror 26 without the folded optical path.

Further, the projection optical system 20 may include any other optical element, such as a condenser mirror, instead of an image-forming lens.

Further, a deflector may be any other mirror, such as a polygon mirror (rotating polygon mirror), a galvano mirror, or a micro electro mechanical system (MEMS) mirror, instead of the rotating mirror 26.

The synchronous system 50 may not include the synchronization lens 52. Alternatively, the synchronous system 50 may include any other optical element, such as a condenser mirror.

According to the above-described embodiment, an automobile is taken as an example for the mobile object 400 equipped with the object detector 100. Examples of the mobile object 400 may include a vehicle other than an automobile, an airplane, an unmanned aerial vehicle, a vessel, and a robot.

Further, specific numerical values and shapes taken for the above description are illustrative only, and can be modified as appropriate without exceeding beyond the scope of the present disclosure.

As is apparent from the above-description, the object detector 100, the sensing device 1000, and the mobile apparatus 600 allows for the technology that measures the distance to an object, utilizing the Time of Flight (TOF) method or the technology used in the TOF. Such a technology is widely used in the industries of the motion-capture technology, the range instruments, and the three-dimensional shape measurement technology, in addition to the sensing in a mobile object 400. Therefore, the object detector 100 and the sensing device 1000 according to the present disclosure may not be mounted on a mobile object 400.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An object detector comprising:
a light-emitting system;
a light detector including a light-receiving element to receive light emitted from the light-emitting system and reflected by the object, and output a signal; and
a signal detector to detect the signal output from the light detector based on a threshold value of voltage,
wherein a degree of sensitivity of the light detector differs between when the light-emitting system emits light to a part of a light-emission range of the light-emitting system and when the light-emitting system emits light to another part of the light-emission range other than the part of the light-emission range,
wherein a ratio of the threshold value of voltage relative to a standard deviation of noise is constant between when the light-emitting system emits light to the part of a light-emission range of the light-emitting system and when the light-emitting system emits light to the another part of the light-emission range other than the part of the light-emission range.

2. The object detector according to claim 1, further comprising a light receiving optical system to guide the light reflected by the object to the light detector,
wherein light utilization efficiency of the light receiving optical system is lower in an emission of light to an edge of the light-emission range than in the emission of light to a center of the light-emission range, and
the degree of sensitivity of the light detector is greater in the emission of light to the edge of the light-emission range than in the emission of light to the center of the light-emission range.

3. The object detector according to claim 1,
wherein the light-emitting system includes a light source and a scanning device to scan the light-emission range with light emitted from the light source, and
wherein the degree of sensitivity of the light detector changes with a scan angle of the scanning device.

4. The object detector according to claim 3,
wherein the light-emitting system includes an incident optical system to cause the light emitted from the light source to enter the scanning device from an outside of the light-emission range.

5. The object detector according to claim 1,
wherein the light-emitting system includes a light source including a plurality of light-emitting elements to divide the light-emission range into a plurality of detection areas for detection.

6. The object detector according to claim 5,
wherein the plurality of detection areas is divided into a plurality of groups fewer than a number of the plurality of detection areas, and
wherein the degree of sensitivity of the light detector differs between the plurality of groups.

7. The object detector according to claim 1,
wherein the light detector is a plurality of light detectors to divide the light-emission range into a plurality of detection areas for detection, and
wherein at least two of the plurality of light detectors change in light-receiving sensitivity for each light-receiving element.

8. The object detector according to claim 1,
wherein the light detector further includes a signal amplifier, which is variable in an amplification factor, to amplify a voltage signal according to an electric current output from the light-receiving element, and
wherein the degree of sensitivity of the light detector changes with the amplification factor of the signal amplifier.

9. The object detector according to claim 1,
wherein the light-receiving element changes in light-receiving sensitivity according to a voltage applied to the light detector.

10. A sensing device comprising:
the object detector according to claim 1; and
a monitoring controller that determines at least one of a presence or an absence of the object, a direction of movement of the object, and a moving speed of the object, based on an output of the object detector.

11. A mobile object comprising:
a mobile object; and
the sensing device according to claim 10 mounted on the mobile object.

12. A mobile apparatus comprising:
a mobile object; and
the object detector according to claim 1 mounted on the mobile object.

13. The object detector according to claim 1, wherein:
a degree of the noise of the light detector is proportional to a square root of the light that has been received by the light detection means.

14. An object detector comprising:
a light-emitting system;
light detection means including a light-receiving element to receive light emitted from the light-emitting system and reflected by the object, and output a signal; and
a signal detector to detect the signal output from the light detection means based on a threshold value of voltage,
wherein a degree of sensitivity of the light detection means differs between when the light-emitting system emits light to a part of a light-emission range of the light-emitting system and when the light-emitting system emits light to another part of the light-emission range other than the part of the light-emission range,
wherein a ratio of the threshold value of voltage relative to a standard deviation of noise is constant between when the light-emitting system emits light to the part of a light-emission range of the light-emitting system and when the light-emitting system emits light to the another part of the light-emission range other than the part of the light-emission range.

15. The object detector according to claim 14, further comprising a light receiving optical system to guide the light reflected by the object to the light detection means,
wherein light utilization efficiency of the light receiving optical system is lower in an emission of light to an edge of the light-emission range than in the emission of light to a center of the light-emission range, and
the degree of sensitivity of the light detection means is greater in the emission of light to the edge of the light-emission range than in the emission of light to the center of the light-emission range.

16. The object detector according to claim 14,
wherein the light-emitting system includes a light source and a scanning device to scan the light-emission range with light emitted from the light source, and
wherein the degree of sensitivity of the light detection means changes with a scan angle of the scanning device.

17. The object detector according to claim 16,
wherein the light-emitting system includes an incident optical system to cause the light emitted from the light source to enter the scanning device from an outside of the light-emission range.

18. The object detector according to claim 14,
wherein the light-emitting system includes a light source including a plurality of light-emitting elements to divide the light-emission range into a plurality of detection areas for detection.

19. The object detector according to claim 14, wherein:
a degree of the noise of the light detector is proportional to a square root of the light that has been received by the light detector.

* * * * *